Nov. 24, 1970  F. A. MORRIS  3,543,267

SCANNING MONITOR SYSTEM

Filed April 7, 1969  32 Sheets-Sheet 2

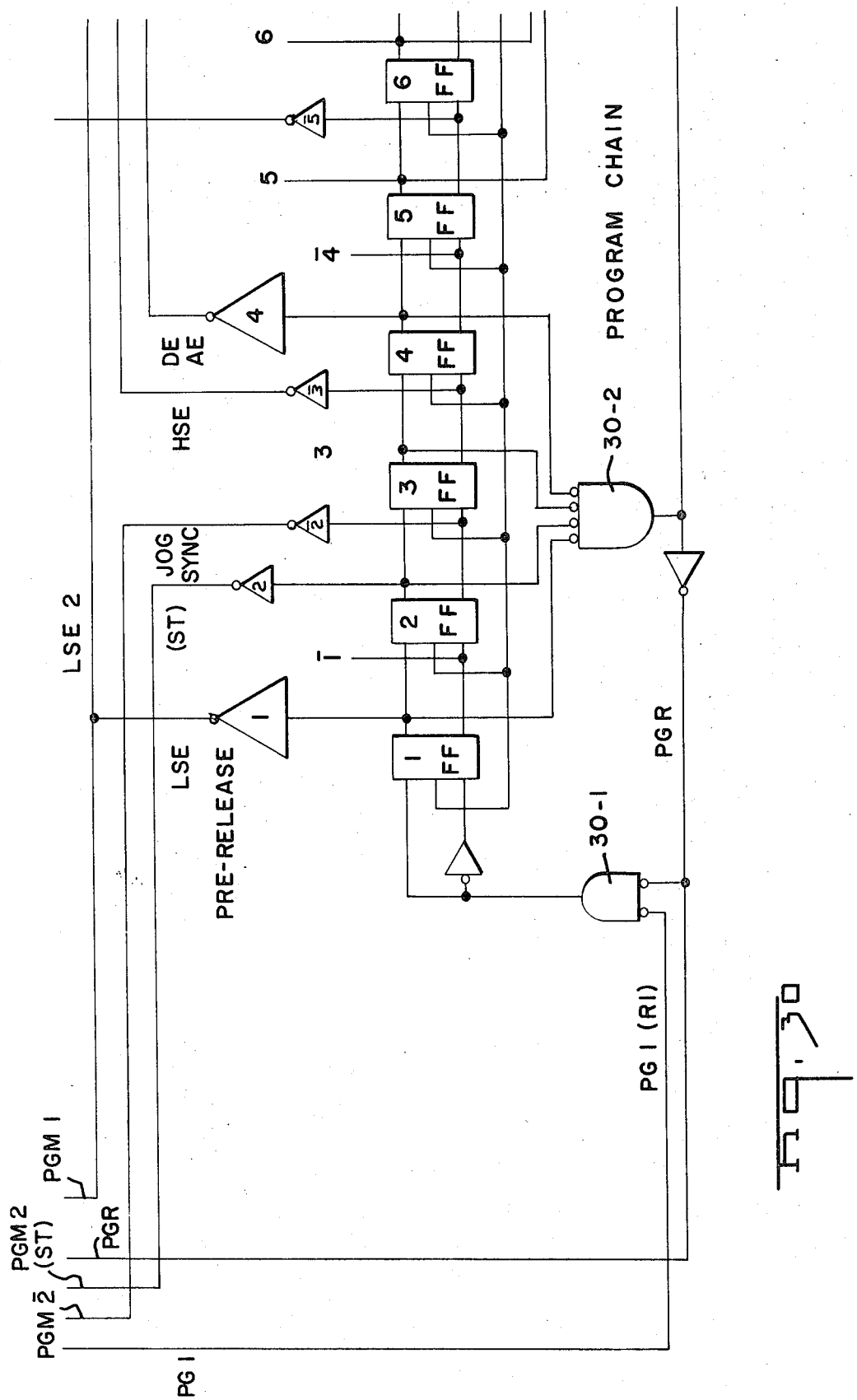

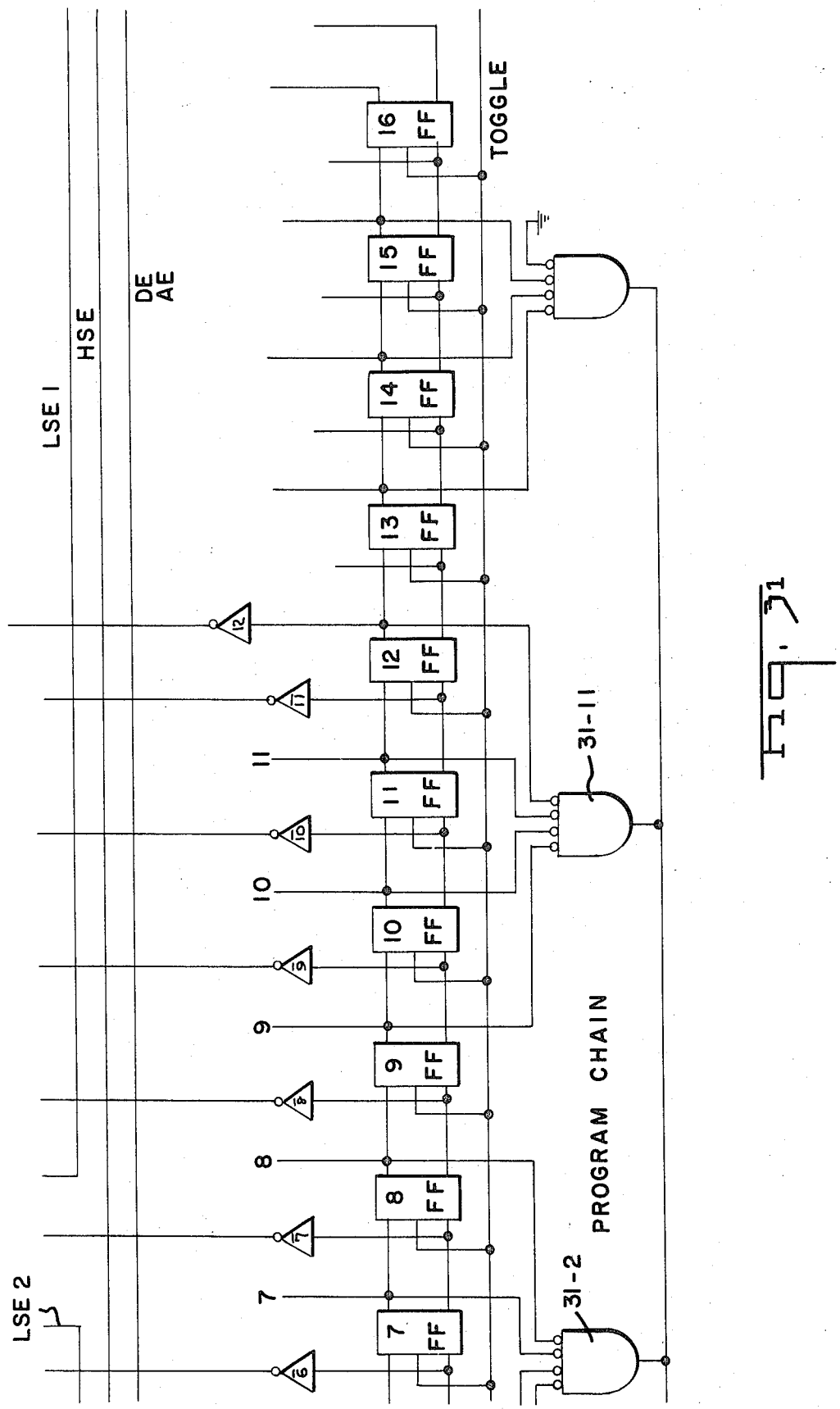

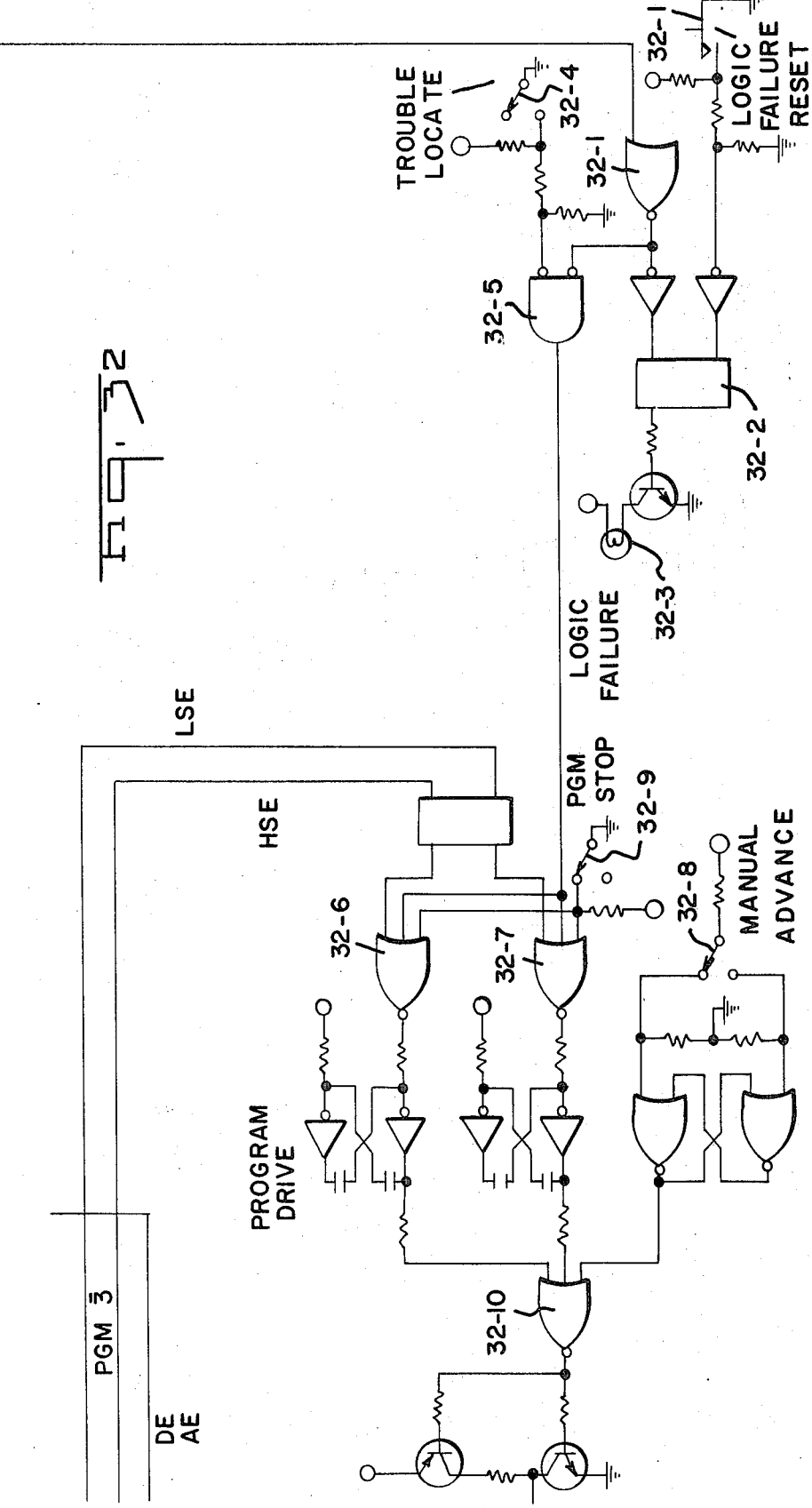

United States Patent Office 3,543,267
Patented Nov. 24, 1970

3,543,267
SCANNING MONITOR SYSTEM
Frank A. Morris, Naples, N.Y., assignor to Transmation, Inc., Rochester, N.Y., a corporation of Ohio
Continuation-in-part of application Ser. No. 757,959, Sept. 6, 1968, which is a continuation-in-part of application Ser. No. 630,753, Apr. 13, 1967. This application Apr. 7, 1969, Ser. No. 813,974
Int. Cl. G08c 15/06
U.S. Cl. 340—413          9 Claims

ABSTRACT OF THE DISCLOSURE

The disclosure relates to a monitor system wherein connection can be established between a control station and any one of plural points under observation. The system includes provision for scanning the plural points sequentially or of manually selecting predetermined points individually. The system also includes provision for stopping the scan and selecting a point to observe with subsequent manual jogging from station to station sequentially by address.

This application is a continuation-in-part of the application of Frank A. Morris for Scanning Monitor System, Ser. No. 757,959, filed Sept. 6, 1968, and now abandoned, which was a continuation-in-part of the application of Frank A. Morris for Monitor System, Ser. No. 630,753, filed Apr. 13, 1967, both applications being incorporated herein in their entirety by reference.

This invention relates to a monitor system capable of continual sequential observation of outlying points and, more specifically, to a monitor system having the universal capability of sequential automatic scanning, manual addressing of a single predetermined point and the ability to manually jog sequentially from point to point.

Monitor systems in general have been well known in the art and perform a useful function therein. Prior art monitor systems have not had the capability of quickly and economically scanning, manually and automatically, plural remote points to determine present state, process and alarm point and changing of alarm point with continual system self checking.

In accordance with the present invention the above noted features, in addition to others, are provided to allow continuous supervision of plant operation.

Briefly, this is provided by means of a scanning system which is capable of sequentially scanning a plurality of outlying points in order and, automatically, checking each outlying point during each scan for various types of failure. The failure tests include logic failure tests, continuity tests and lamp tests in addition to other tests. In this manner, the system is substantially self checking and errors or faults in the system can be pin pointed to a very narrow area in a minimum of time and without the requirement of highly trained technical personnel. The system also includes provision for stopping the scan and dialing a particular outlying station and then scanning sequentially therefrom manually. In addition, the alarm conditions or the present conditions of a particular outlying station can be stored by providing a system which is manually directed to choose the desired condition from the preselected station when the scan reaches that station and without stopping of the scan of the stations.

It is therefore an object of this invention to provide a monitor system capable of manually or automatically scanning a plurality of outlying stations to detect alarm conditions.

It is a further object of this invention to provide a monitor system as above described which is rapid in operation and economical relative to prior art systems.

It is a still further object of this invention to provide a monitor system capable of automatically self checking individual portions of the circuit to pin point circuit failure.

It is a yet further object of this invention to provide a monitor system capable of storing and digitally displaying selected conditions of a preselected station without stopping of the scan.

The above objects and still further objects of the invention immediately become apparent to those skilled in the art after consideration of the following specification of a preferred embodiment of the invention which is provided by way of example and not by way of limitation wherein.

FIGS. 3 to 32 provide a schematic diagram of the monitor system in accordance with the present invention.

Figure 1:
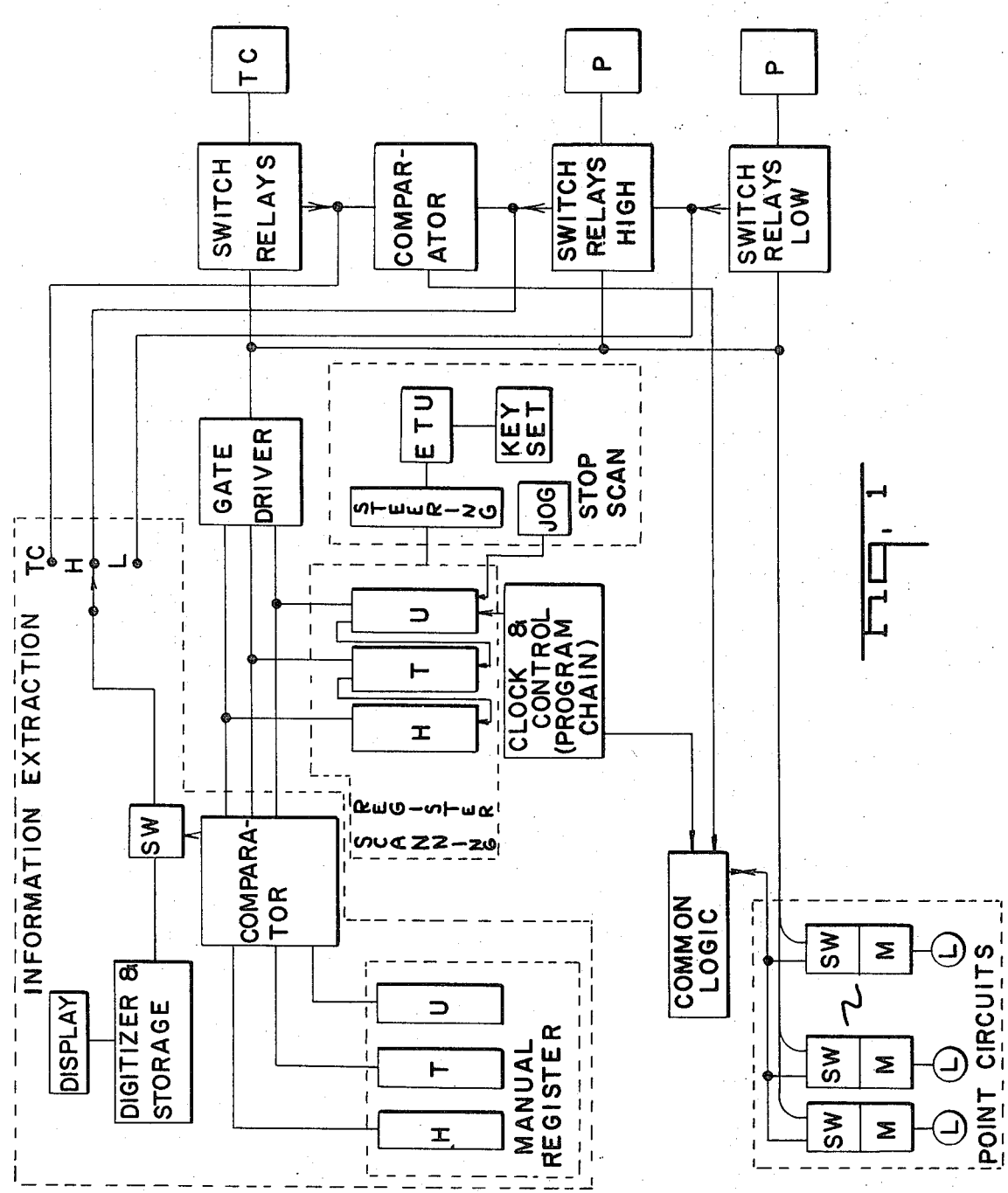
FIG. 1 is a block diagram of the preferred embodiment of the invention.
Figure 2:
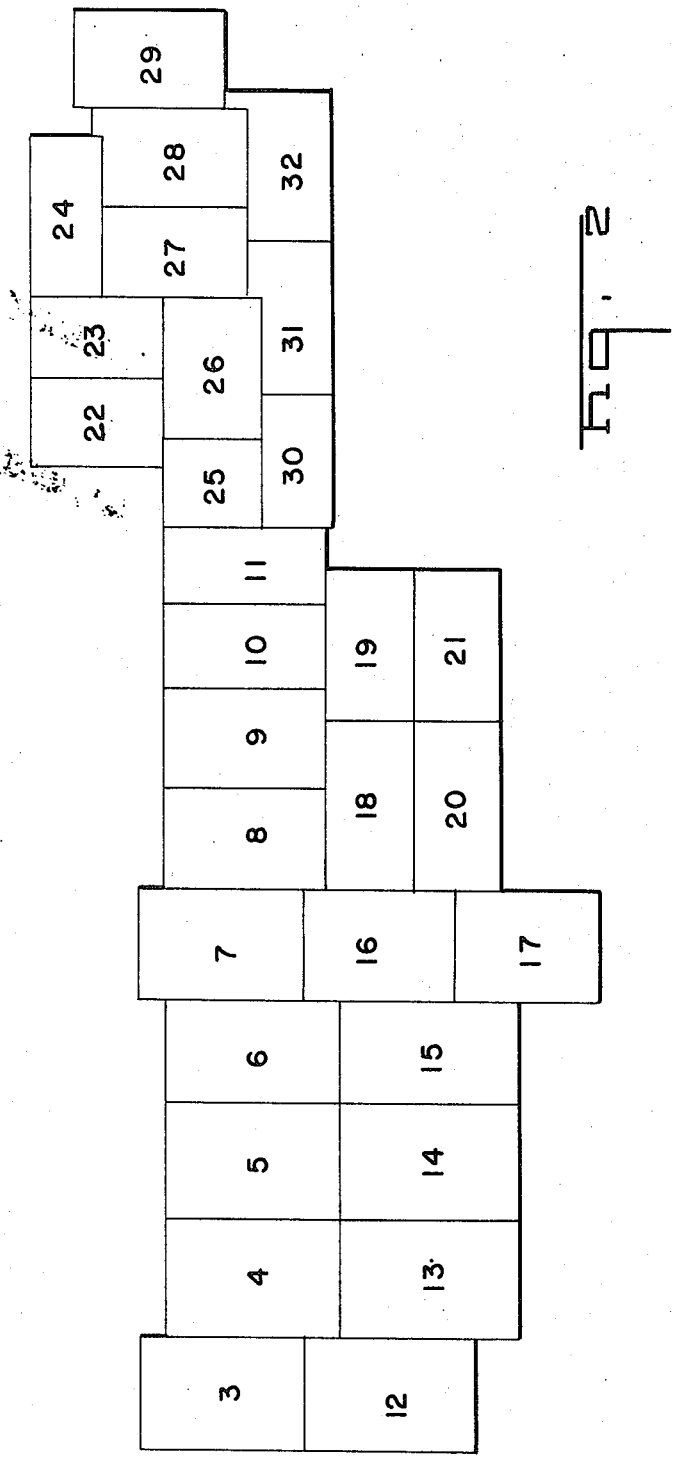
FIG. 2 shows the arrangement of FIGS. 3 to 32.
Figure 3:
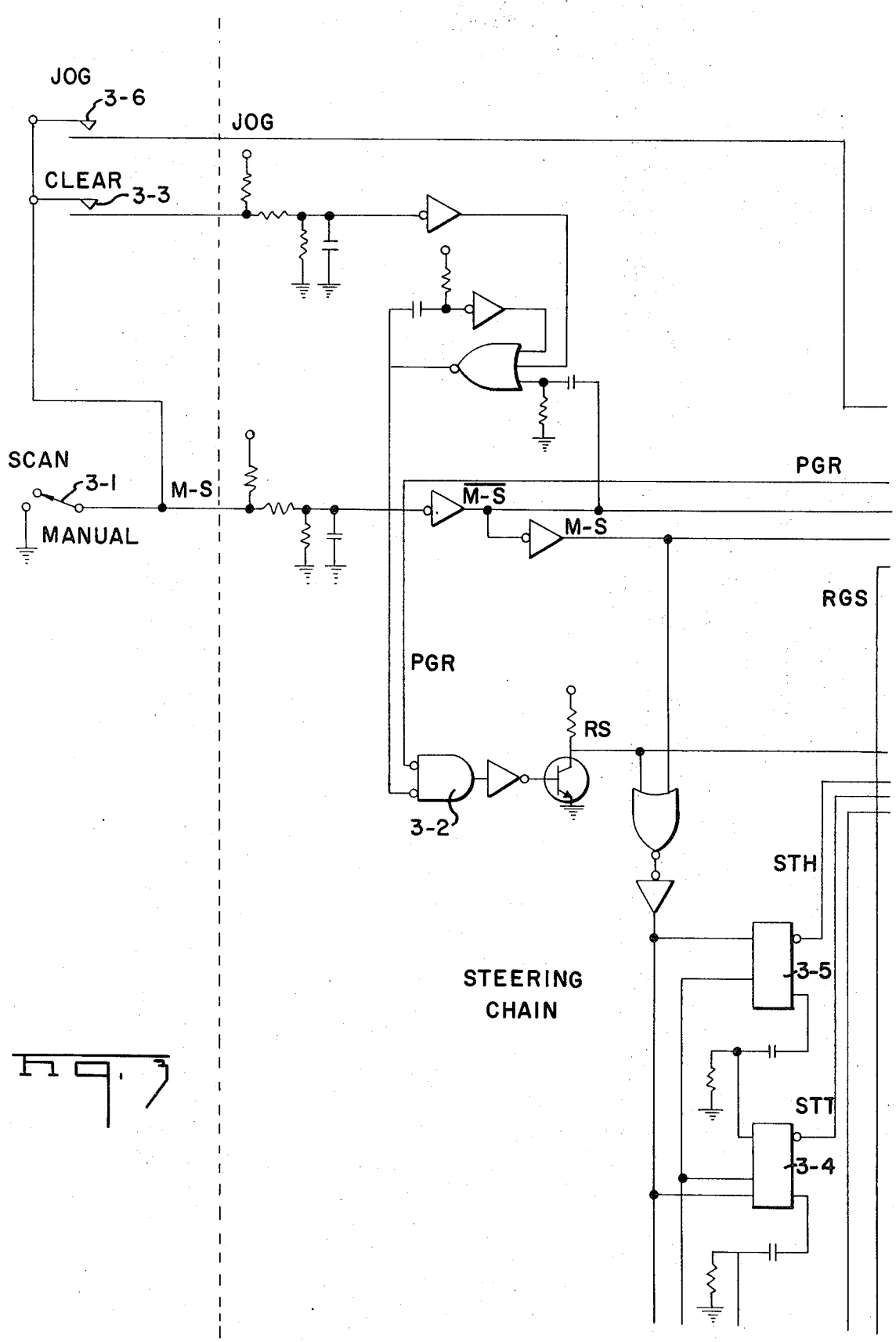

Referring to FIG. 1, the block diagram of a preferred embodiment of a system in accordance with the present invention, the system includes a scanning monitor system with auxiliary equipment for stopping the scan labelled STOP SCAN wherein an address can be entered to locate a specific point. The system also includes auxiliary equipment to choose a particular station and remove, store and display information therefrom without stopping the scan or the scanning monitor system and its operation. The latter auxiliary equipment is entitled INFORMATION EXTRACTION.

Referring first to the normal scanning monitor arrangement, wherein the auxiliary equipment labelled STOP SCAN and the auxiliary equipment labelled INFORMATION EXTRACTION are not included, the system is operated by turning same on and clearing the scanning register whereby the units (U), tens (T) and hundreds (H) registers can be reset to zero to provide a reading of 000, though this is not necessary. The scanning register provides the address for the station being sampled. The scanning register will then proceed to scan through the stations sequentially under control of the clock and control or program chain whereby the various station addresses will be presented sequentially to the gate drivers. The gate driver outputs are actually a plurality of lines, these outputs being coupled to each station through associated switch relays whereby a transducer or the like, such as a thermocouple, can be connected by means of the relays to a comparator. The block labelled "switch relays" includes a unique combination of relays or switches for each address and the "thermocouple" box includes a thermocouple or other similar type of transducer at each address point.

The gate drivers also are connected to the switch relays for determining high alarm set points on a station by station basis in the same manner as indicated for the transducers in the box TC and these relays couple a potentiometer, preset to the high point alarm condition, to the comparator in the same manner as indicated hereinabove for the thermocouples TC. The comparator then compares the signal received from the selected transducer with the alarm set point signal received from the potentiometer circuits P associated therewith and provides a signal to the common logic indicative of the status on the high side of the selected station. The status for the low side can also be provided by connecting the gate drivers to the low set point switch relays with associated potentiometers P determining the low alarm condition. Again, the output of the switch relays for the low alarm condition would be fed to the comparator for comparison with the output of the thermocouples or other transducers to provide an alarm signal to the common logic circuitry. For the low alarm condition, either a separate comparator for comparing transducer output and low alarm set points or a switching circuit would be used with the same comparator as utilized with the high alarm switch relays.

The common logic is controlled by the clock and control or program chain and provides output signals to point circuits and receives in return output signals from the point circuits. The output of the common logic drives the point circuits which are enabled selectively by the output of the gate drivers to provide an indication of the status of the station associated with the particular point circuit and also provide a memory of the status of the particular station during the prior scan for use by the common logic in evaluating station status. The station status is displayed by a lamp L, buzzer or the like.

The program chain, in addition to causing the system to scan sequentially from station to station, also initiates internal self checking and other operations on a station by station basis as each station is selected, as will be explained in more detail hereinbelow.

It can be seen that the basic system explained hereinabove will cycle through all of the outlying address points sequentially and compare the outlying transducer status with high and/or low alarm set points to provide signals to a common logic circuit indicative of station condition. Output signals are then provided based upon present and prior alarm status of the individual stations. The STOP SCAN feature of the invention is provided by the operation of a circuit in the STOP SCAN block (not shown) whereupon the program chain is stopped at the end of a program cycle and the scanning register is cleared. The station to be selected is then called by the key set of the STOP SCAN system by actuating keys in a manual key board indicative of the address of the station to be selected. By means of logic circuitry and a steering circuit, the selected address is placed into the scanning register which, due to inhibition of part of the program chain operation, is no longer scanning. The program chain will, however, perform its non-station scanning function. In this manner, the system can be locked onto a single station. The system will then operate in the manner described hereinabove for the scanning system.

The system can also be "jogged" whereby a jog key can be operated in order to change the address in the scanning register to the next successive address. In this manner, the number in the scanning register will be changed and cause the system to operate for the new address in the same manner as explained hereinabove. The system also includes the INFORMATION EXTRACTION feature whereby, without stopping the scanning operation, the condition at a particular station can be selected, stored and displayed. This can also be done for a high or low alarm point on a station by station basis. This feature is provided by coupling a switch arm or the like to one of three points noted as TC for thermocouple or other transducer input, H for high alarm set point and L for low alarm set point. These set points are connected respectively to the outputs from (1) the switch relays connected to the transducers, (2) the switch relays connected to the high alarm set point potentiometers and (3) the switch relays connected to the low alarm set point potentiometers. The desired station is selected via a manual register (not shown), which can be of the same type as the register of the key set in the STOP SCAN system. The output of the manual register is fed to a comparator which compares the station designation with that in the scanning register. Upon receiving a match or comparison, the switch SW is opened and transmits the signal from the point TC, H or L, depending upon the arm setting, to the digitizer and storage whereupon the signal is digitized, stored and displayed. This is provided without interrupting the operation of the basic scanning system.

Referring now to FIGS. 3 through 32, there is shown a schematic diagram of the system in accordance with the preferred embodiment of the invention. In operation, the point circuits (FIGS. 22 to 24) are initially reset, either automatically or by depressing the acknowledge and restore keys (FIG. 25), as will be described in detail hereinbelow.

The clock or program drive (FIG. 32) starts to send drive pulses via the toggle bus to a shift register (FIGS. 30 and 31) which is the program chain and provides pulses sequentially for operation of each of the steps of the monitor system cycle in proper sequence.

When the system is turned "on," a priming circuit causes a zero to be entered in all of the registers of the scanning register (FIGS. 4 to 7 and 13 and 17). This is done immediately after power is turned "on." The clock pulses will drive until all of the stages of the scanning system are driven to the ends whereupon the priming circuit will set in a zero in each of the stages thereof. In other words, each of the stages is pulsed through to 9 and the next action gives a 000 and the system is then ready to begin.

Figure 4:
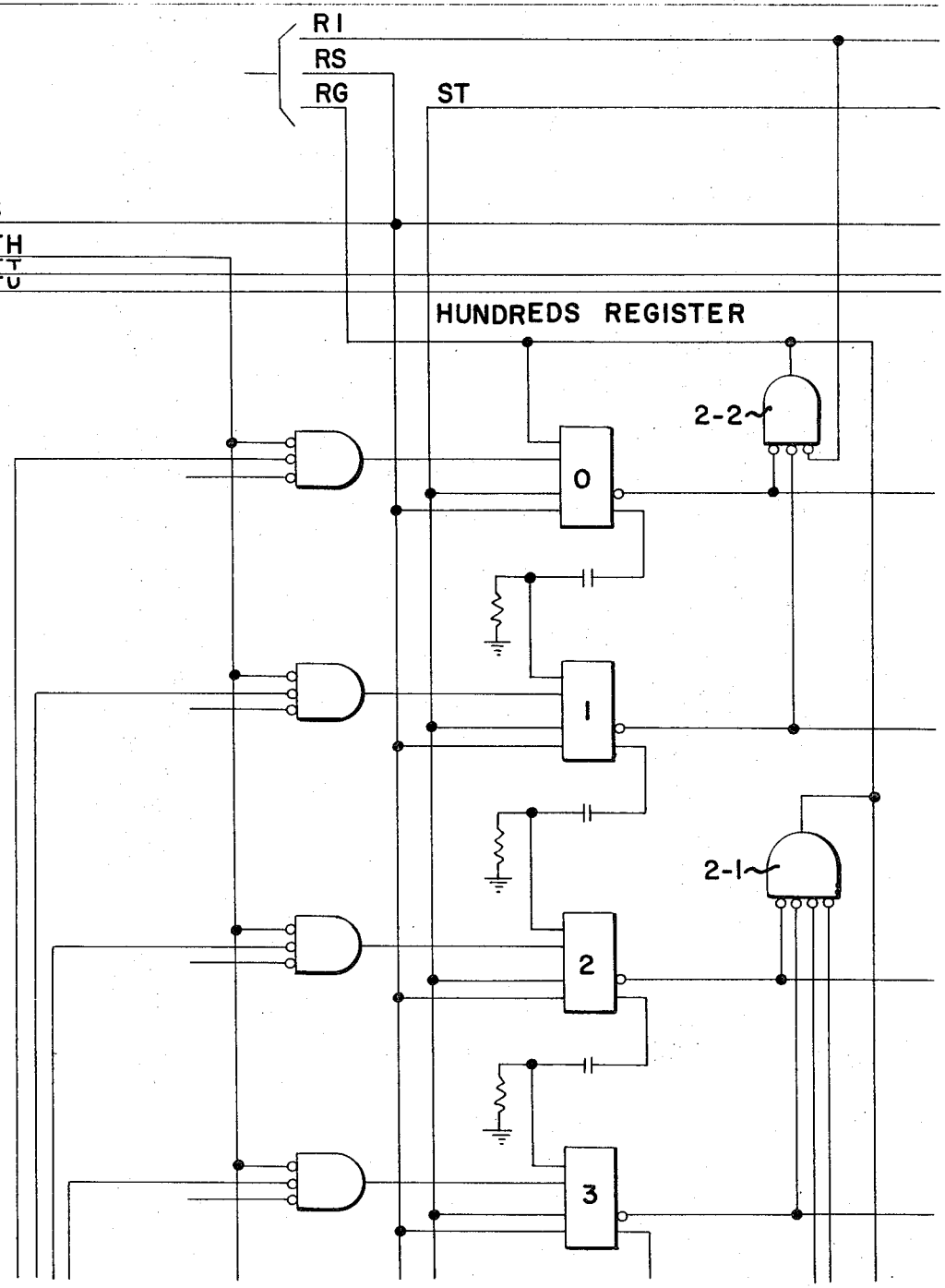
Figure 5:
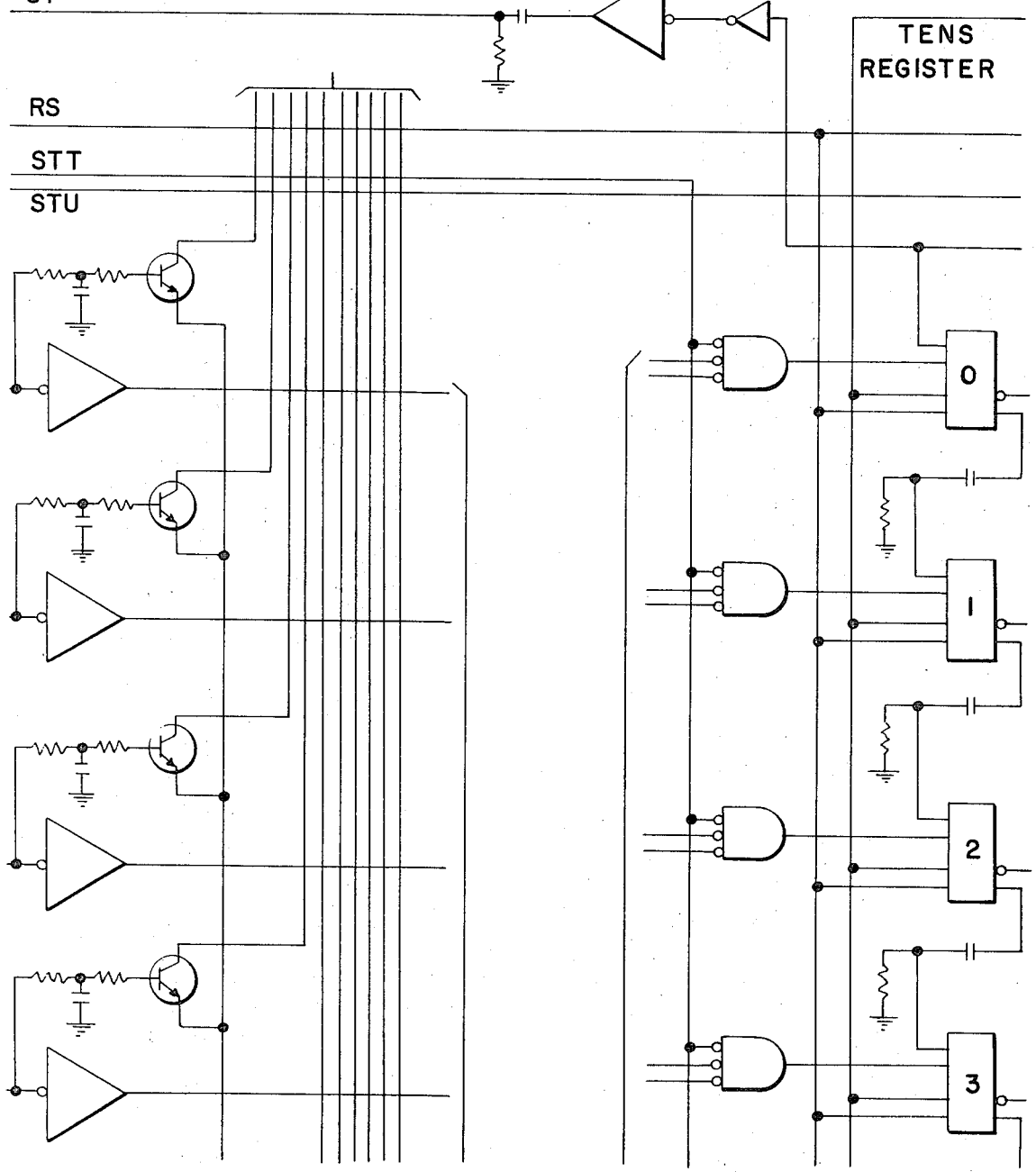
Figure 6:
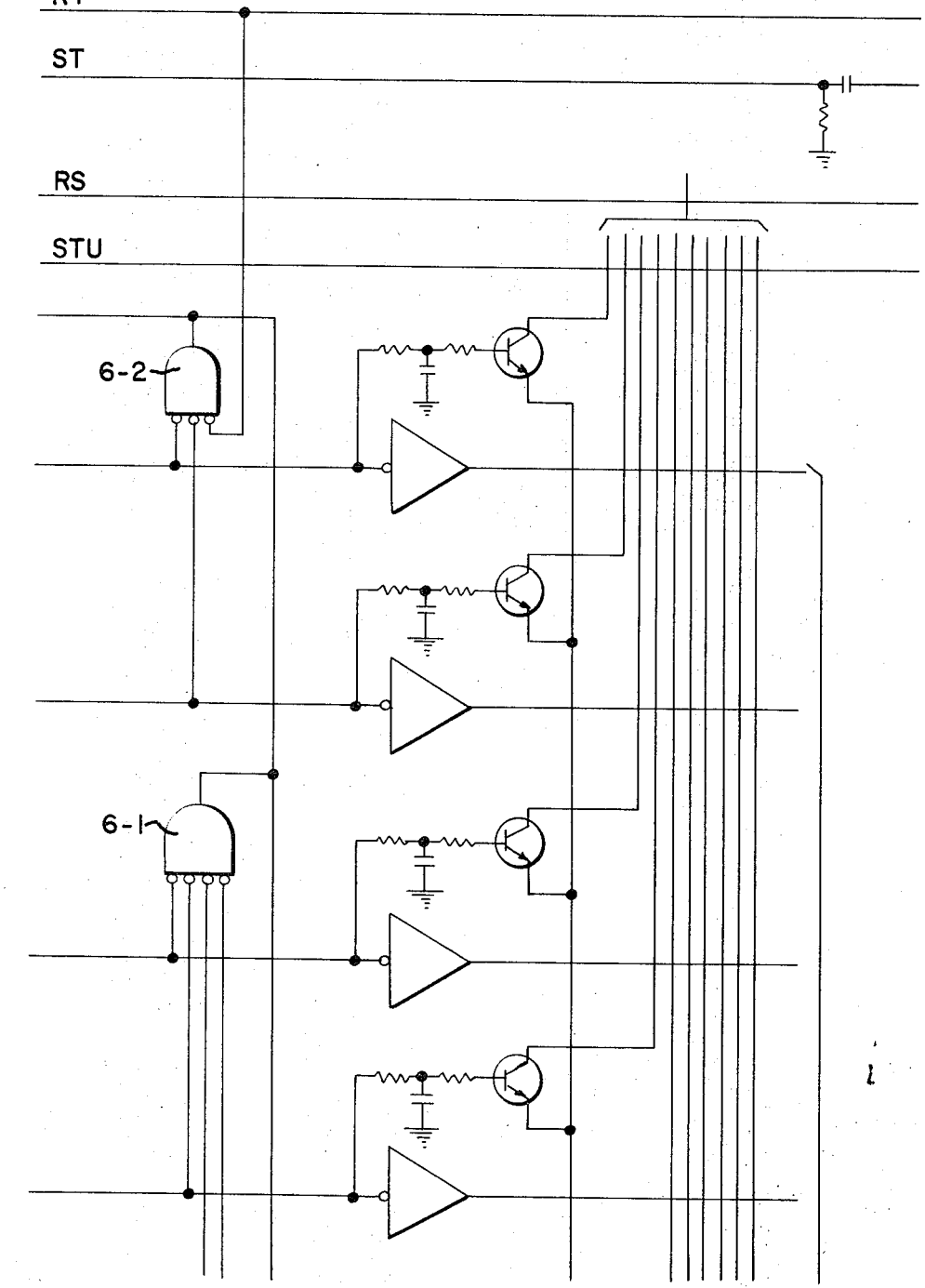
Figure 7:
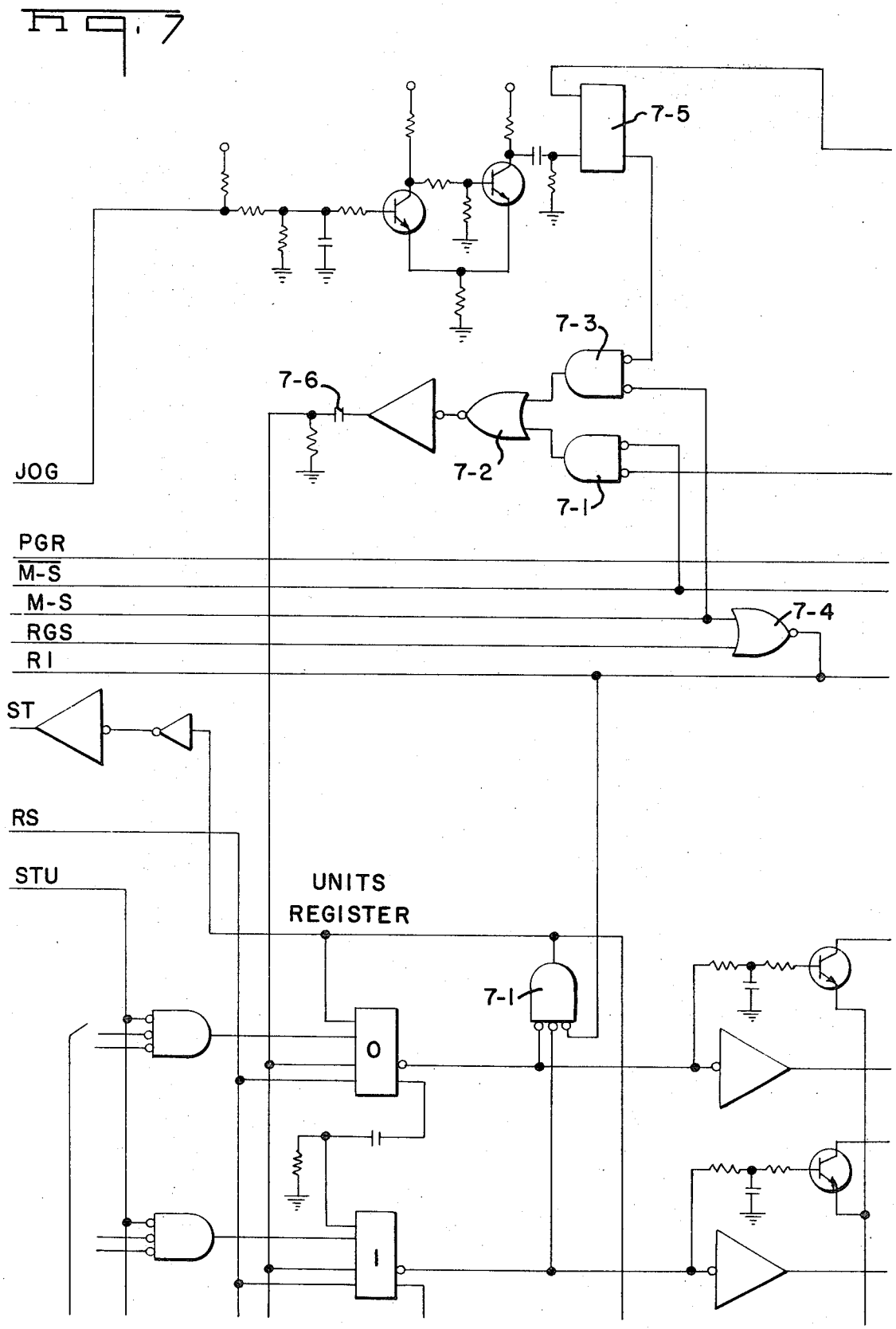
Figure 13:
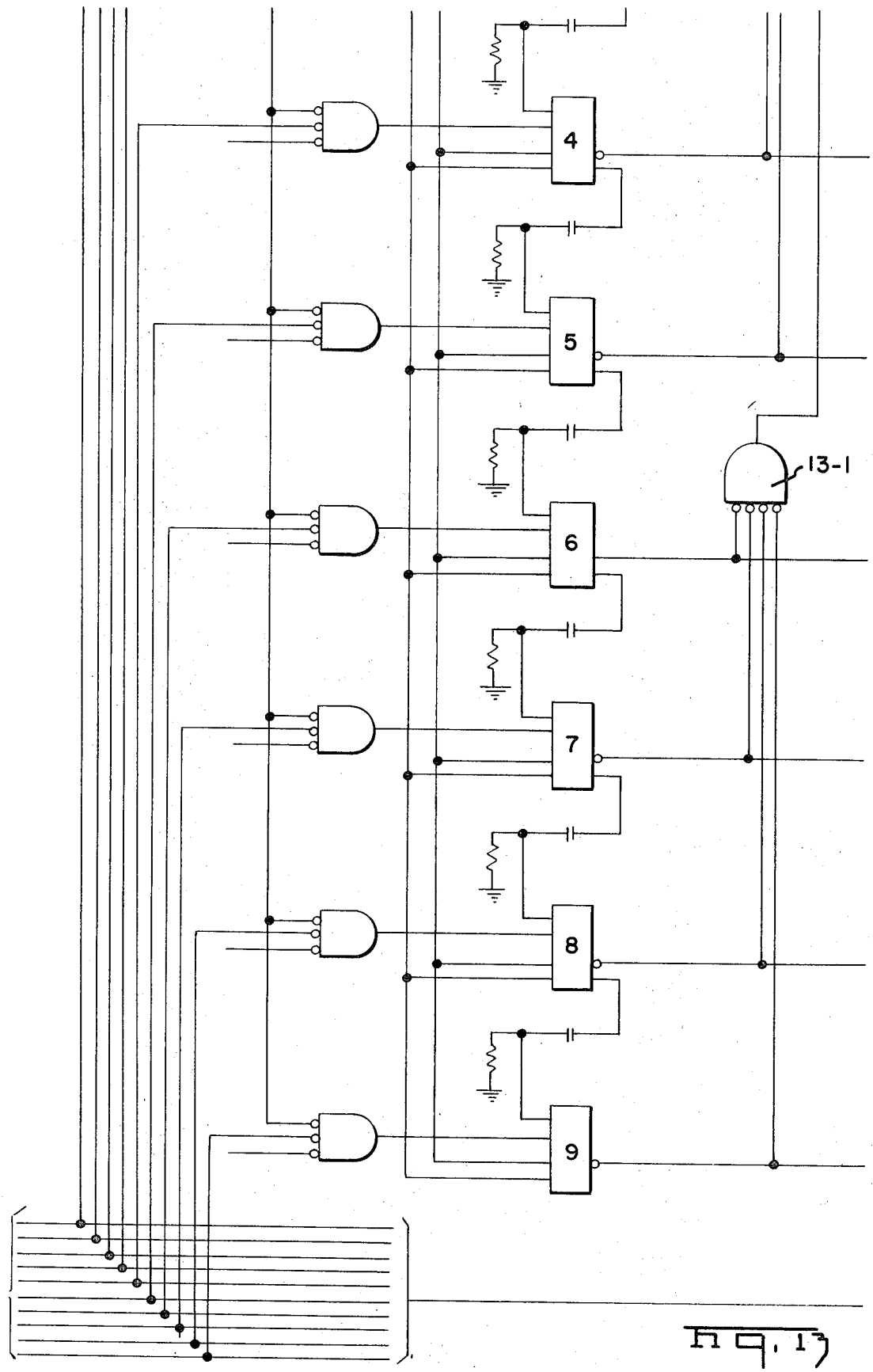
Figure 14:
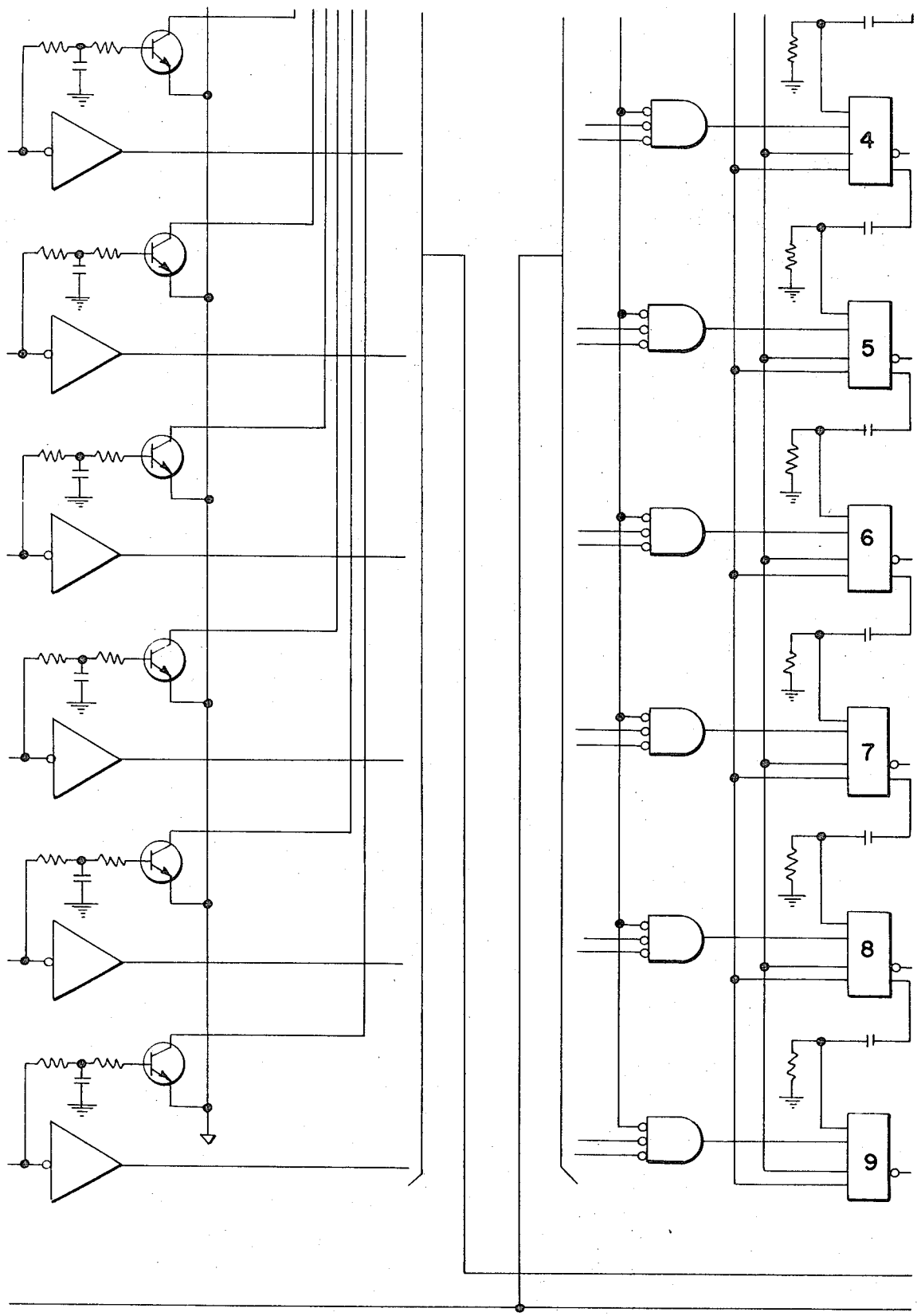
Figure 15:
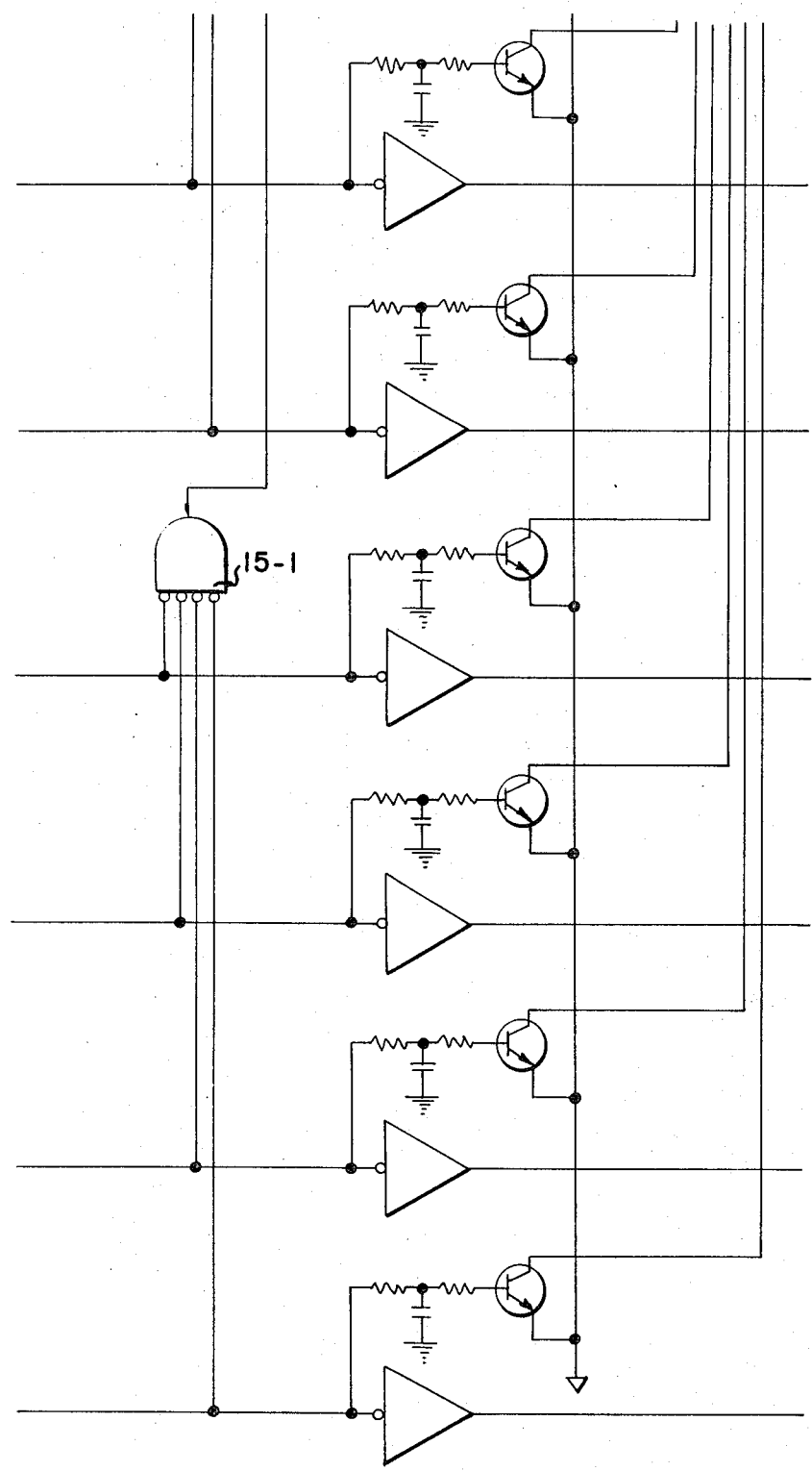
Figure 16:
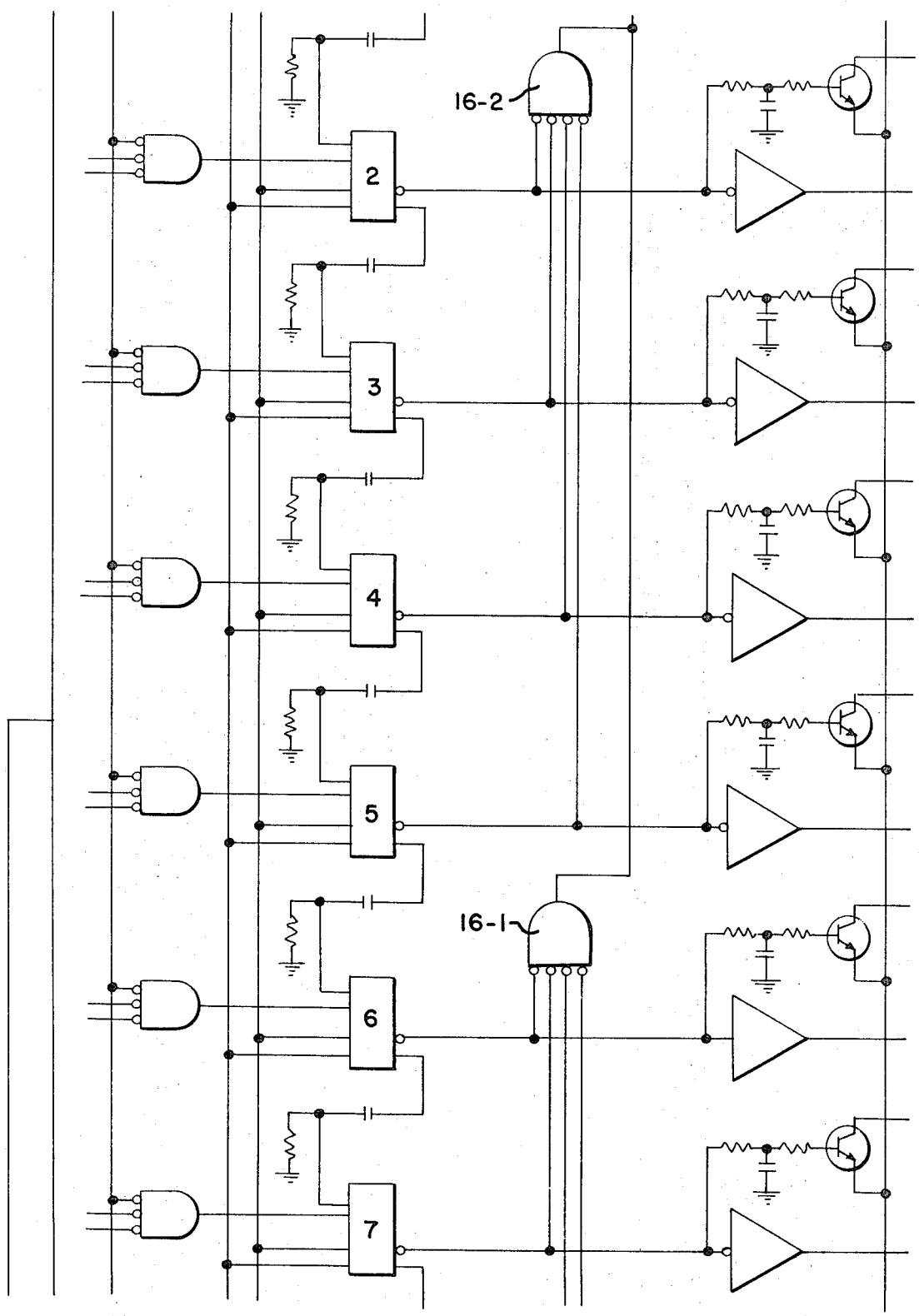
Figure 17:
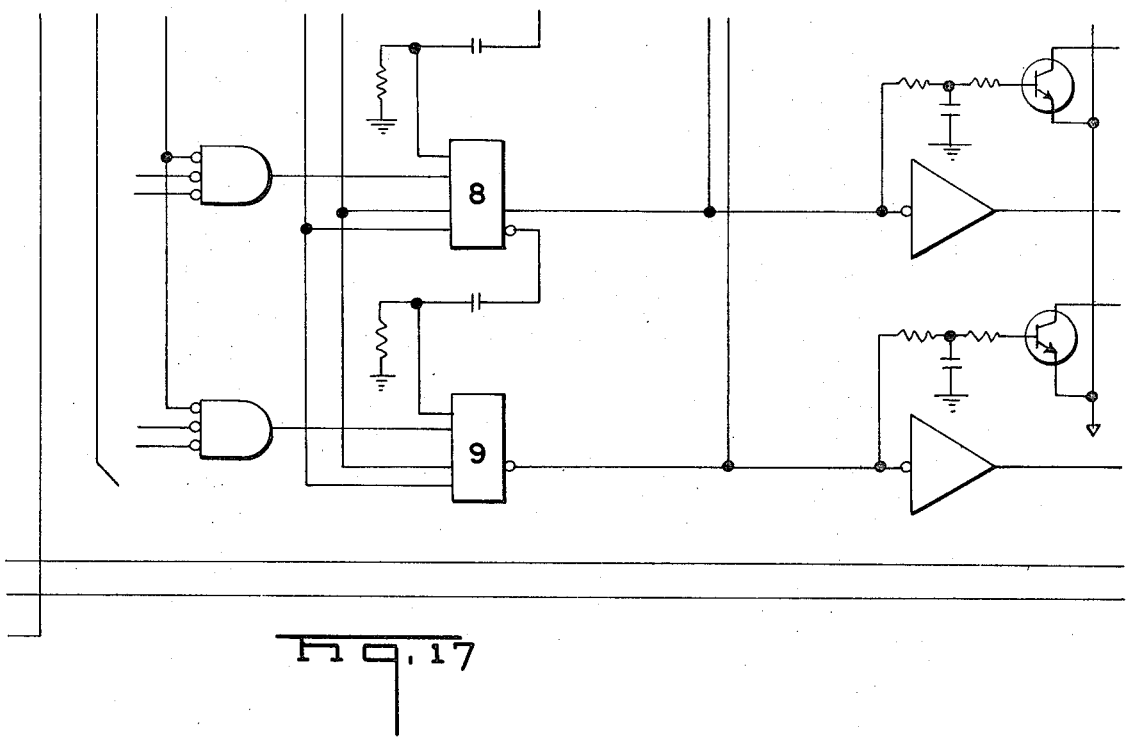

We now start with a 000 in the scanning register. Each time a step pulse comes from stage 2 (ST) of the program chain, this pulse is applied to the units register (FIGS. 7, 16 and 17) and will continue to step the units register through a count of nine. The next pulse will provide a pulse to the tens register (FIGS. 5, 6, 14 and 15) and also reset the units register. This will also operate in the same manner for the hundreds register (FIGS. 4 and 13). At 999, the next pulse will cause all of the registers to be reset to 0.

The operation of the system will now be considered in greater detail. The clock or program drive (FIG. 32) starts and drives the program chain (FIGS. 30 and 31). The program chain in turn drives the scanning register and causes operations to be performed for each address of the scanning register.

When the power came on initially, the priming caused a zero to be set in to the first stage of each of the registers—if needed. The clock pulses will drive each of the registers through to zero in the event that some of them were not in the zero state when the power was turned on. The self-priming self-correcting circuit will then set in a single zero. We therefore arrive at a condition 000 in the register automatically. Whenever a step pulse comes from the ST lead of the program chain, it is applied to the units register and advances it one step to 001. It should be noted that each of the scanning registers are shift registers. When reaching 009 the next pulse will reset the units register and thereby cause a pulse to be sent from the units register to the tens register to provide 010 and similarly for the hundreds register after a reading of 099. When we get to 999 the next pulse will reset all of the registers and provide a 000 reading.

The units register drives the units relays with gate drivers interposed (FIGS. 8, 9, 18 and 20). The tens and hundreds registers drive a gate matrix of gate driver cards (FIGS. 9 to 11, and 19 to 21). Wherein the tens are the horizontal of the matrix and the hundreds are the vertical of the matrix. We therefore need a coincidence of a tens and a hundreds to energize one gate, but one and only one gate will be opened for a combination of a tens and a hundreds register signal. Thus, for the station 123 we will energize the vertical bus for the one or hundreds and enable all the tens gates in that line. Also the number "two" tens digit will remove the disabling bias from the number two horizontal line. It is clear that the only gate that is opened is that one corresponding to the number "one" hundreds and the number "two" tens, thereby opening the "one-two" or 12 of the tens-hundreds gates.

Figure 8:
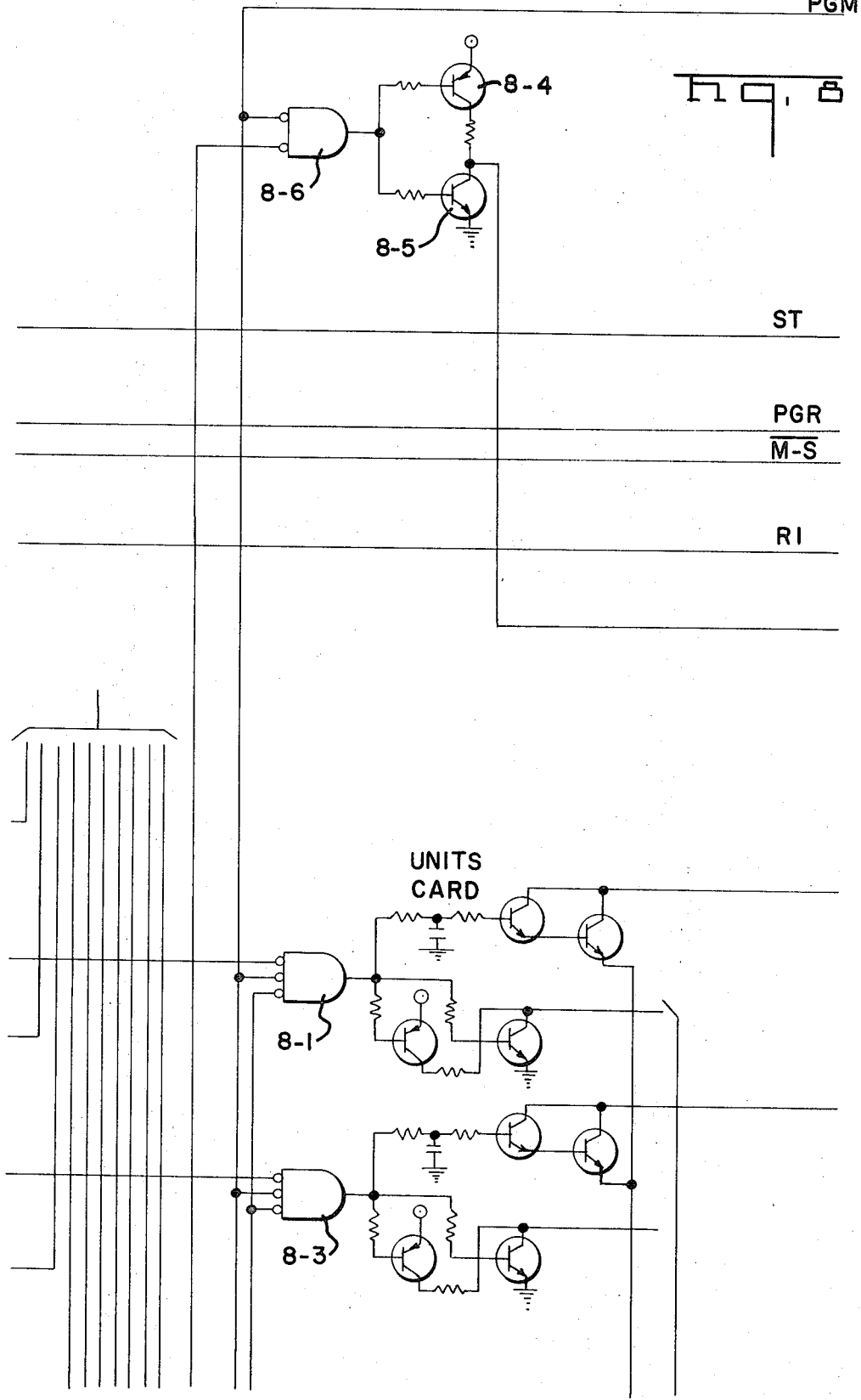
Figure 9:
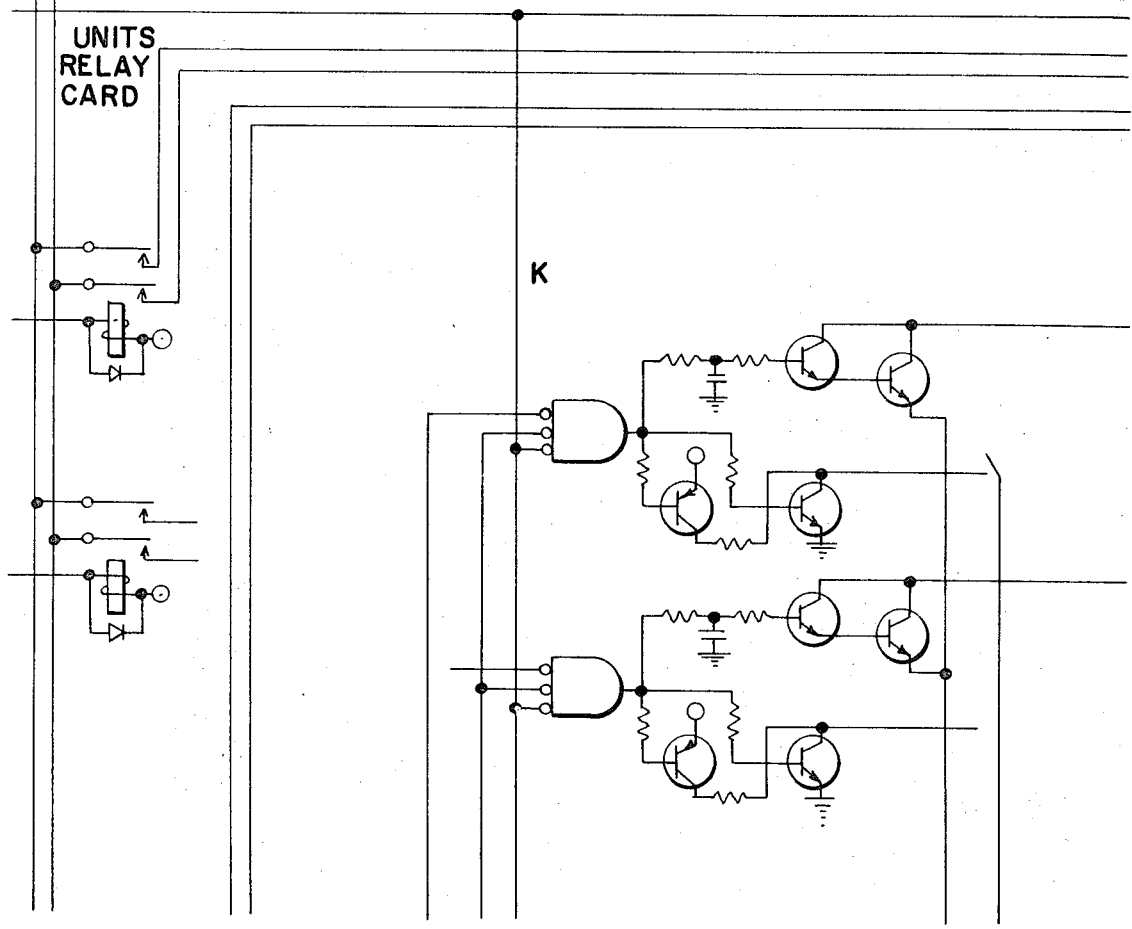
Figure 10:
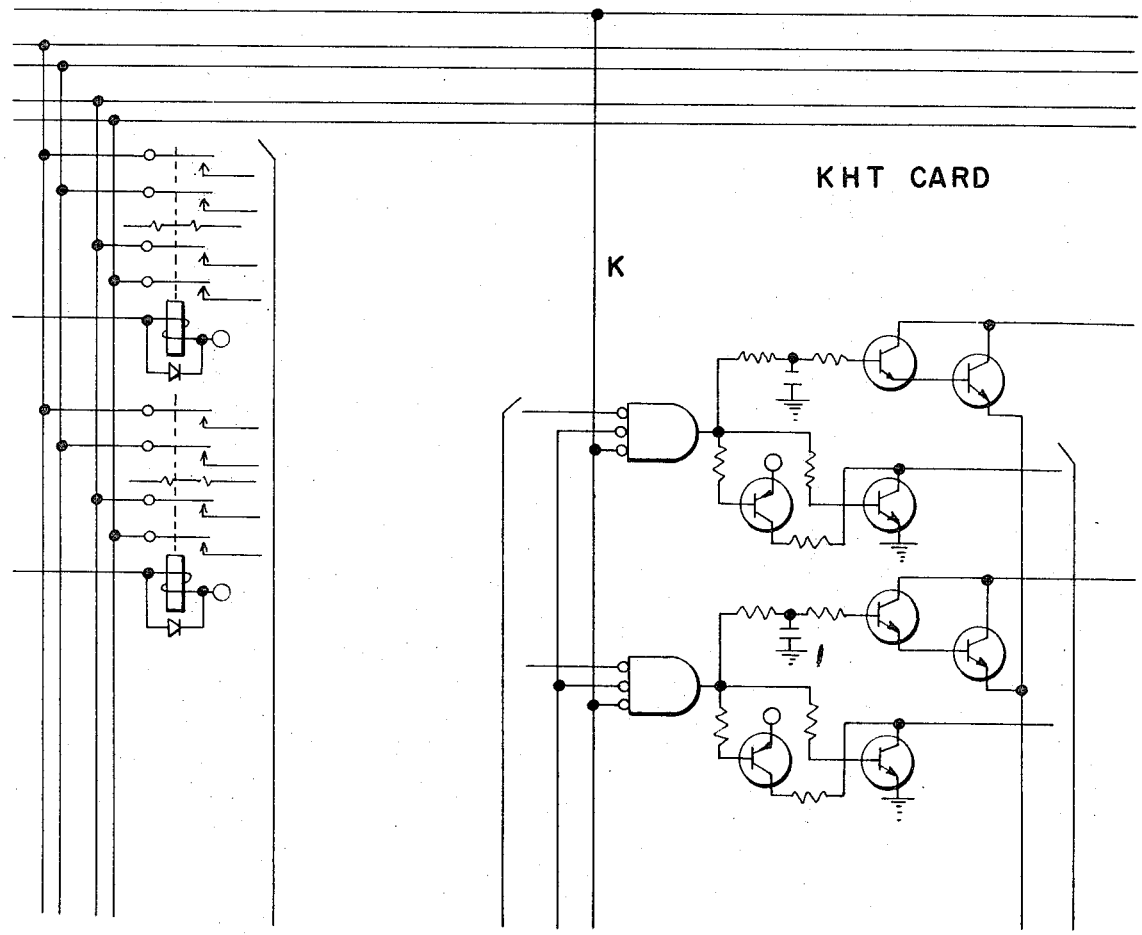
Figure 11:
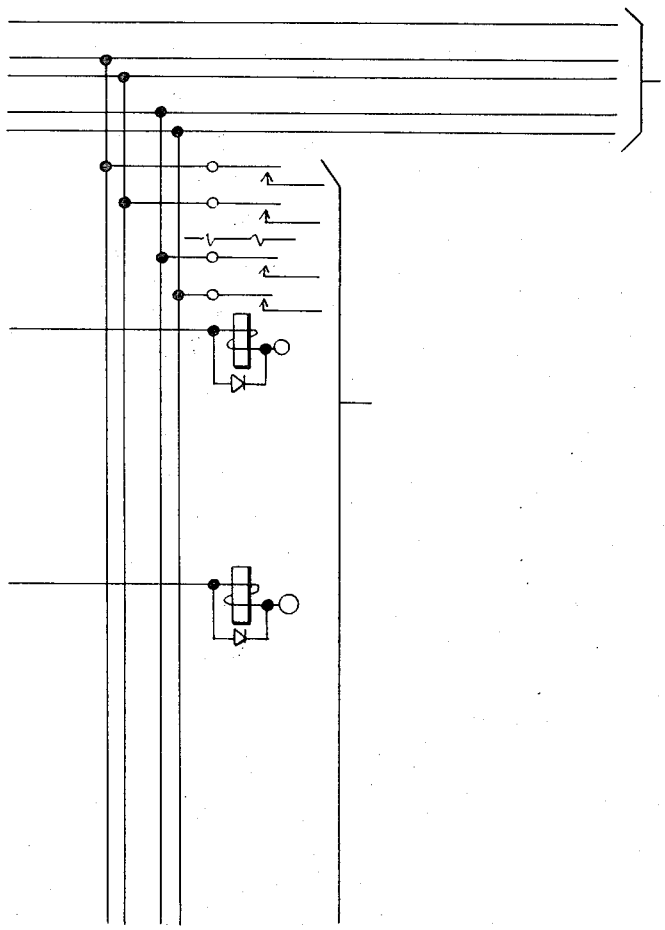
Figure 18:
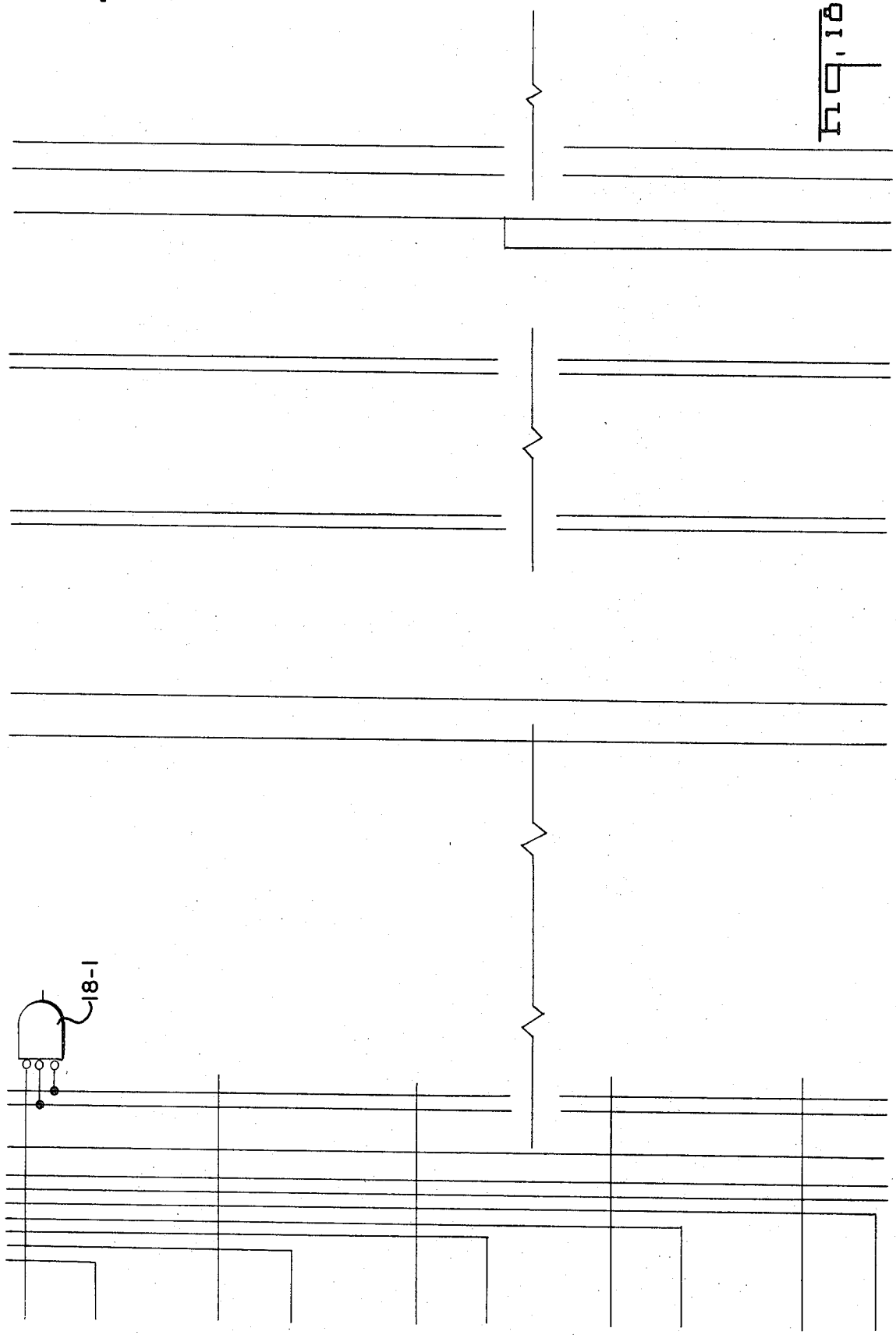
Figure 19:
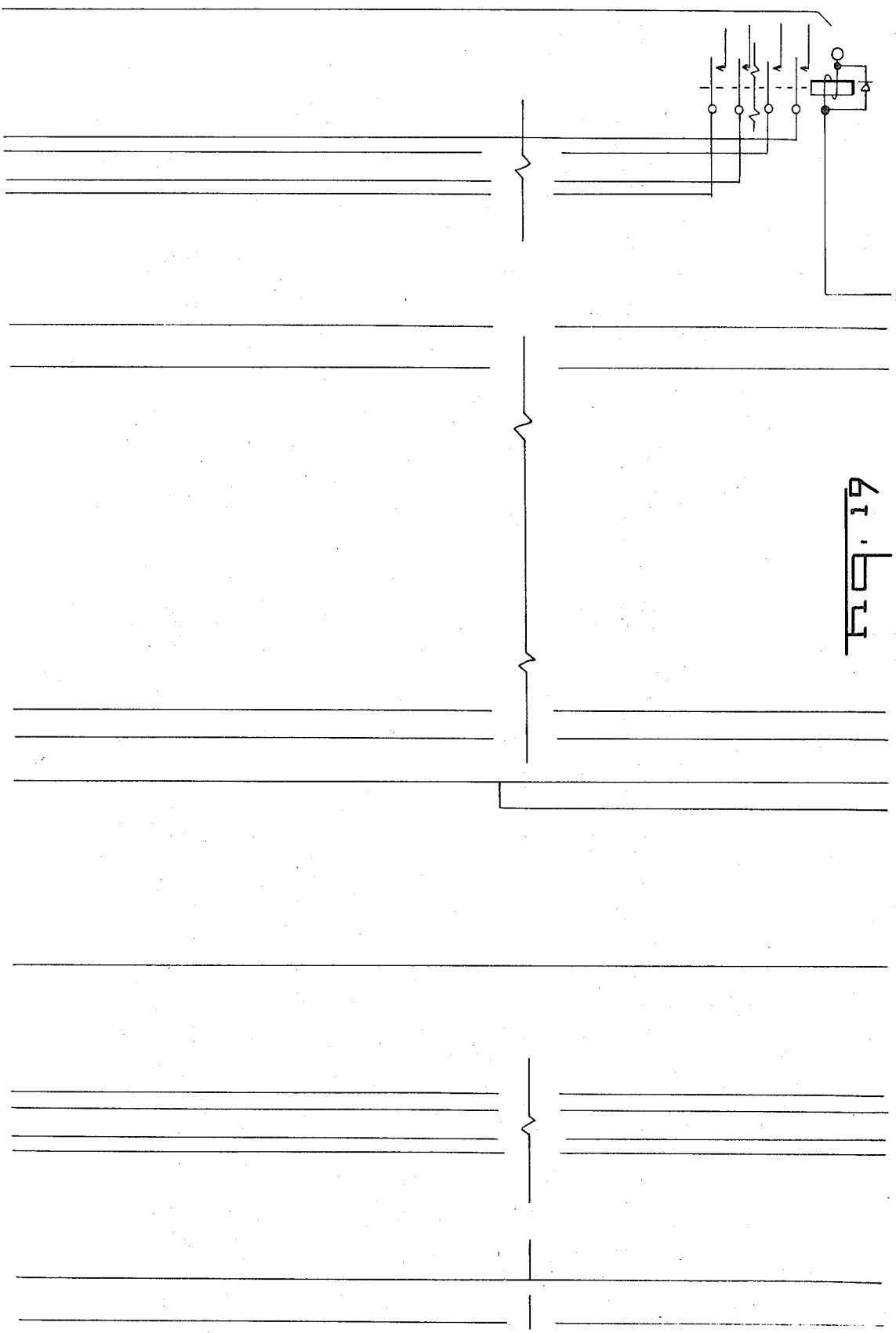
Figure 20:
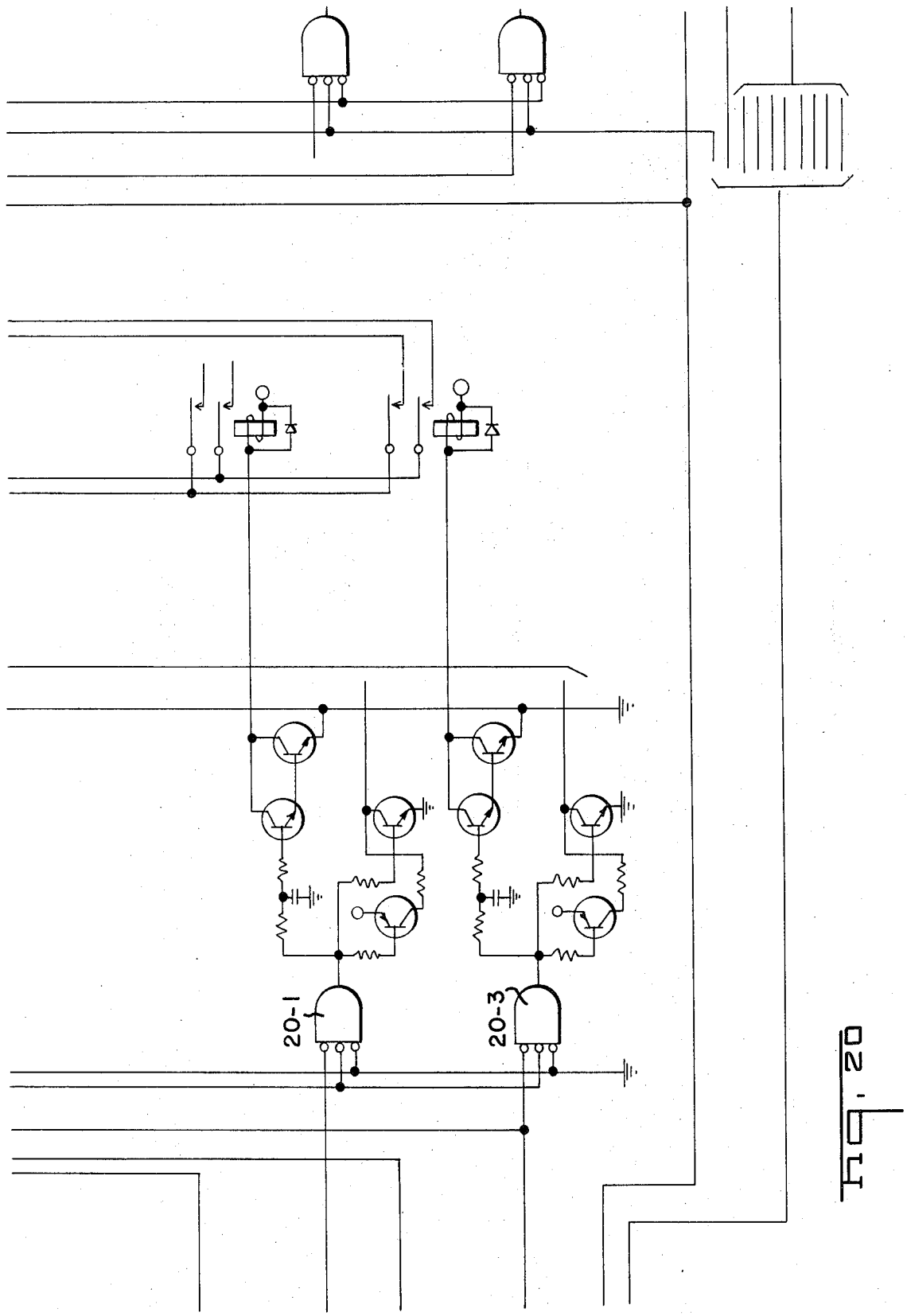
Figure 21:
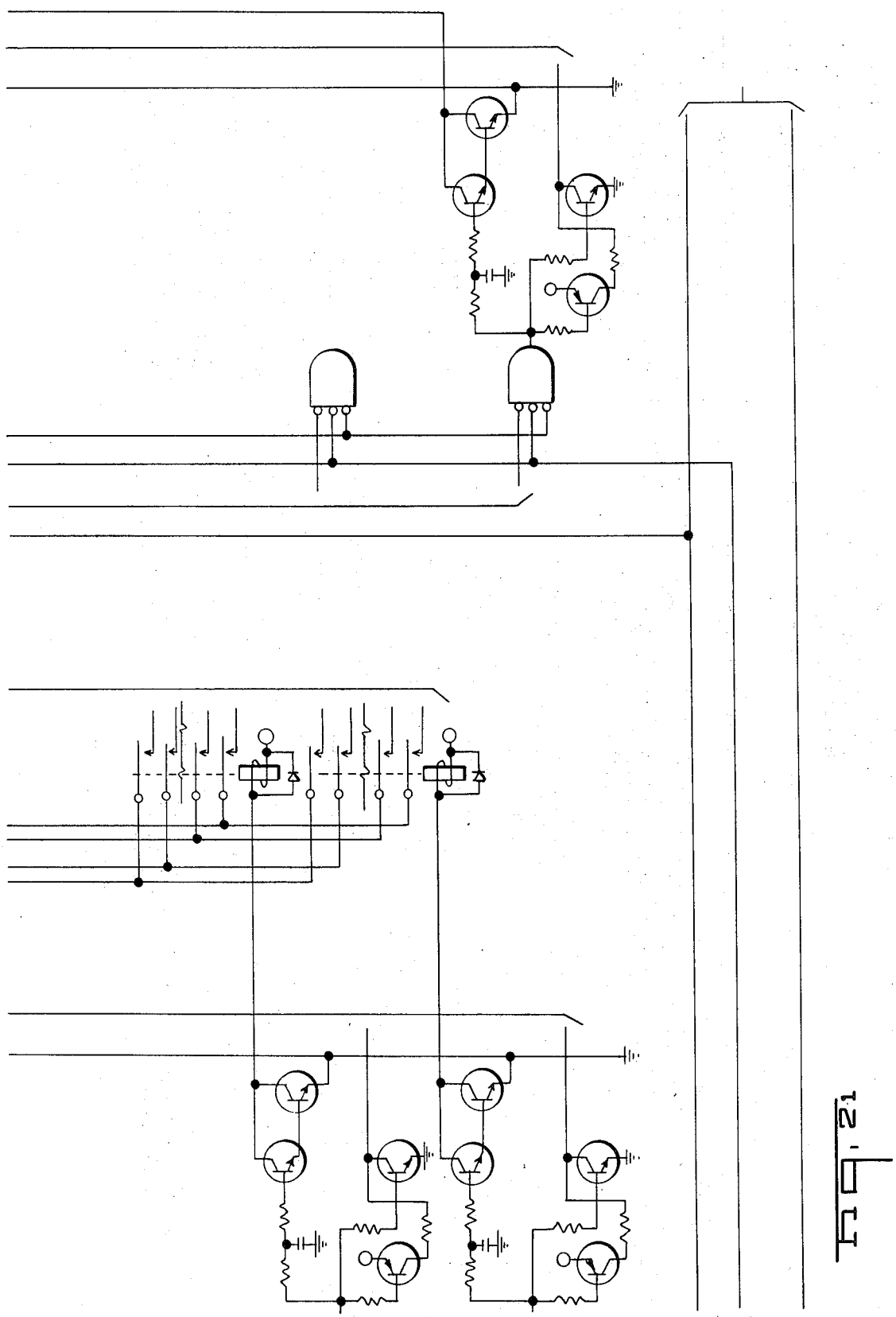

It is never desirable to have an accidental loop between two thermocouples or outlying transducers. Therefore one must not change instantly from one address to the next. If the operate and release times of the various relays are almost identical, there is a very good chance to provide the unwanted loop by the grounding or paralleling of each of the lines to the thermocouples or transducers. There is accordingly provided what is termed as prerelease (PGM1) which drops off the relays from the old address while changing the address. This is provided by the additional input in the gate driver cards which we have in the case of the tens-hundreds drivers cards along with a tens and hundreds signals thereto and the units driver card along with units signals thereto. This signal is called PGM1 program signal. The PGM1 signal goes directly to the third input of the AND gates 8–1, 8–3, 8–6, 18–1, 20–1 and 20–3 of the units input driver card (FIGS. 8, 18 and 20). All of the address is not yet changed at this time because the units gate driver card has been disabled by the PGM1 signal and the relay that was held up is now dropped. PGM2 or ST signal now comes up and changes the address in this embodiment.

The tens-hundreds relays (FIGS. 9, 10, 11, 19 and 21) are not changed in the same manner but are operated with a prerelease combiner (FIG. 8). This circuit 8–6, 8–4 and 8–5 takes the prerelease signal PGM1 and the number 9 output of the units register (FIG. 20) which says that the register is about to move into another decade. There will therefore be a change of the gang relay or tens-hundreds relay also and the old gang relay should open and a new one should close. The prerelease PGM1 therefore prereleases the units relay and the gang relay. The new gang relay will now stay up or closed until the next decade. It is therefore clear that the prerelease before the tens-hundreds relays is at one tenth the rate of the units relays. The prereleasing is very important since it saves wear on relays to a great extent as compared with prior art devices. The tens-hundreds relays are actually called gang relays because they can be tens-hundreds-thousands, etc. In other words, we would use two matrices, one matrix driving the next in the event that tens-hundreds-thousands were to be used and so on.

To summarize the operation of the program chain (FIGS. 30 and 31), the first step from the program chain is prerelease PGM1 and low speed clock enable LSE and the second step (ST) is to enter a new address into the scanning register. The second half of step 2 is for jog synchronization and will be described in detail hereinbelow. The third step (first half) provides settling time, is a guard and nothing takes place. At this point that is the third step (second half), the speed of the clock (FIG. 32) is changed to high speed (HSE). The first two steps required a slow clock because they were relay operations. From here on, operation is at solid state logic speeds. Settling time is also required for the analog circuitry to attain stability. The amount of settling time can be varied by using more or less steps of the chain as indicated for step 3.

The HSE or high speed enable and LSE or low speed enable signals select the clock speed. At step 3 a logic rate clock is operated which is the HSE or high speed enable signal.

Figure 22:
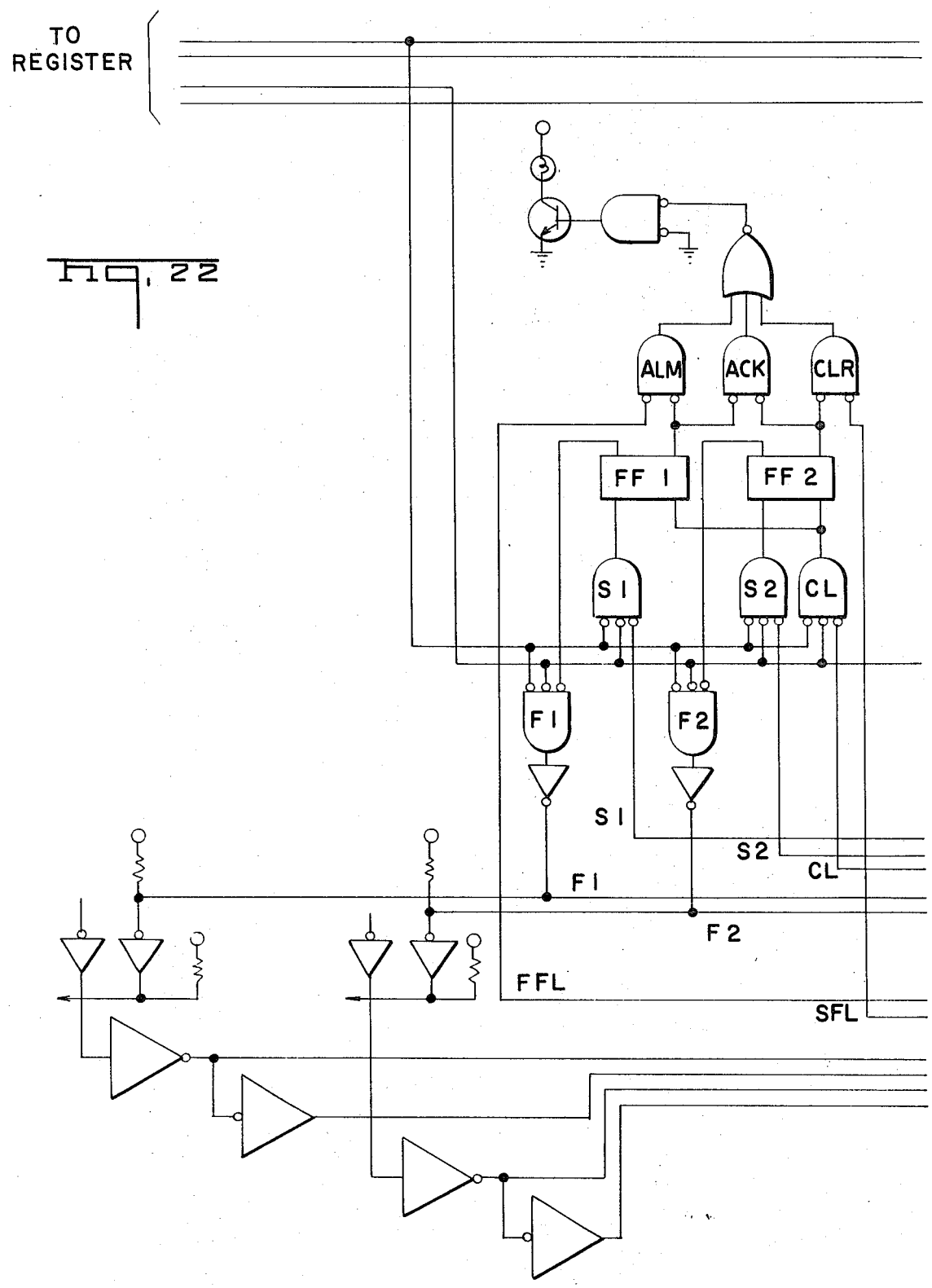
Figure 23:
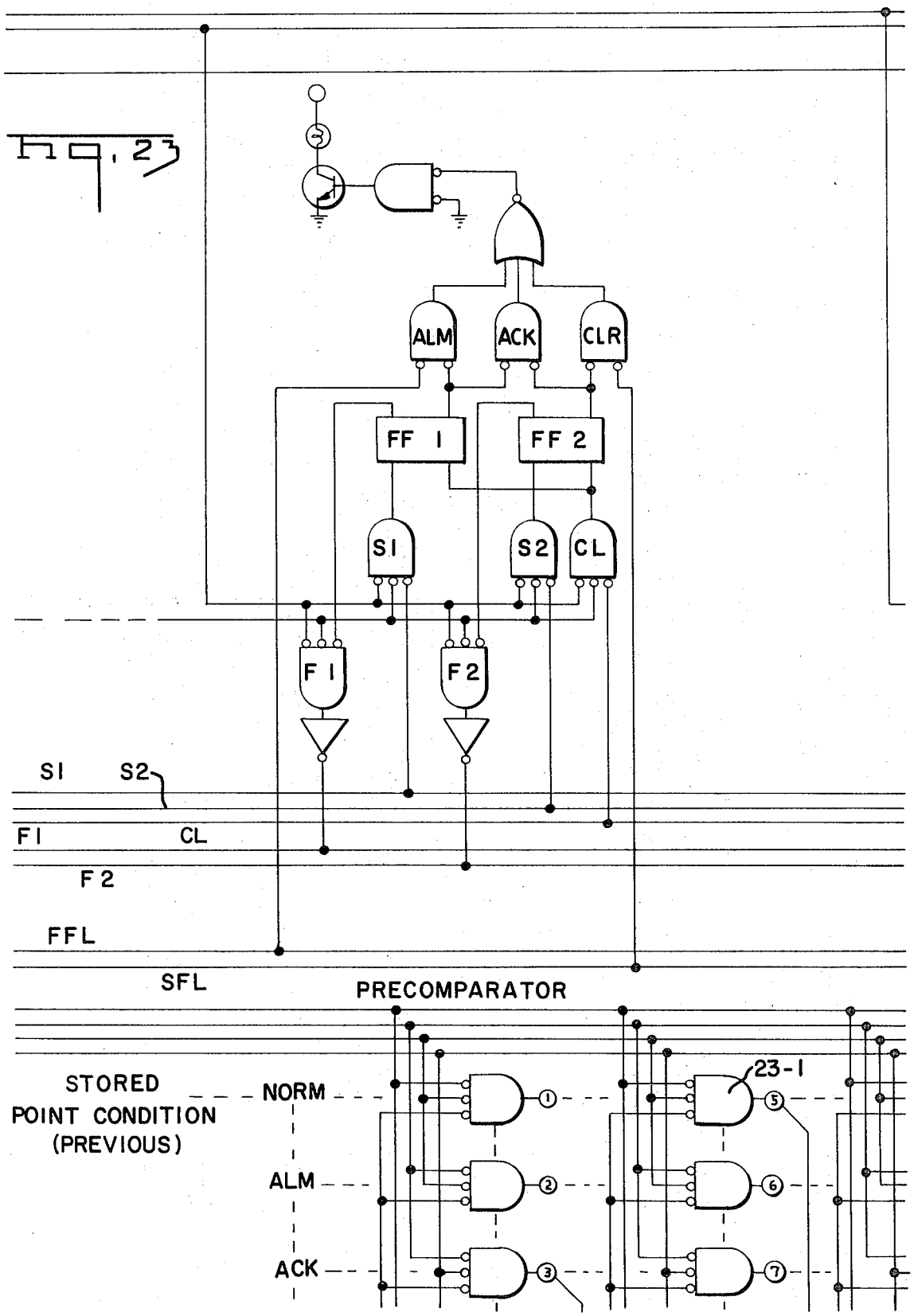
Figure 24:
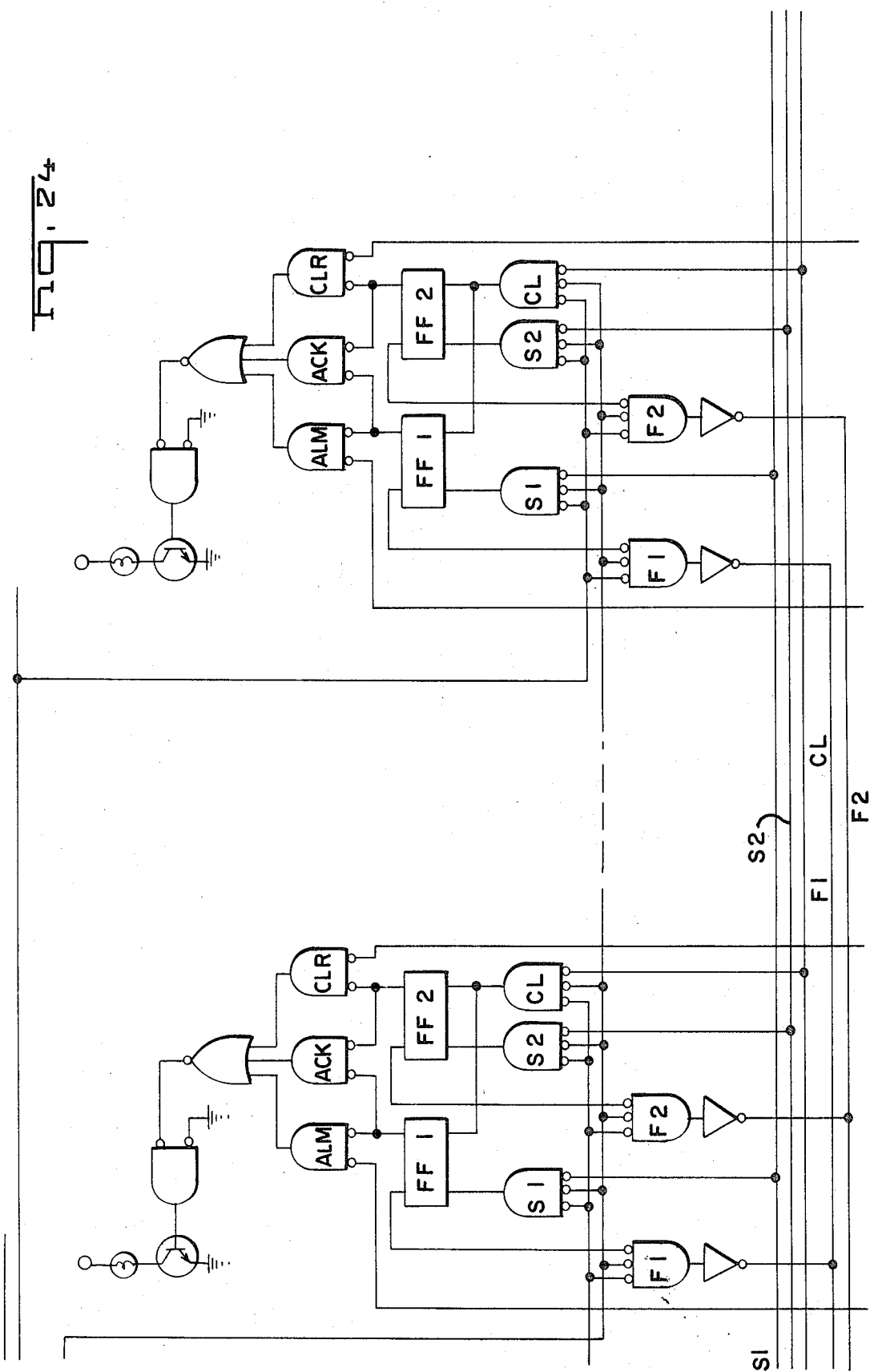

The function of program step 4 (DE or decision enable and AE or alarm enable) is to compare the present condition with the prior condition of a point circuit (FIGS. 22 to 24). This is actually done prior to program step 4, but at step 4 it is assumed that settling has taken place and the analog signal has reached stability, thus the "go no-go" signal is a valid one.

At this point (step 4), the output of the precomparator (FIGS. 23, 26 and 27) is permitted to move into the decision circuit (FIGS. 27 and 28) by means of the step 4 DE signal which is for decision enable and AE which stands for alarm enable.

One of the outputs of the precomparator is provided when an alarm appears for the first time. This is a new alarm that nobody has seen before and the horn or the like 26–1 is turned on. It is not desired to turn this horn on while the system is settling as from a high temperature point of a prior reading to a low temperature point at this reading. Settling is required so that a false alarm will not be provided. The gate pair is therefore disabled so that a new alarm can not be registered until the proper time. The decision is locked in the decision flip flops (FIG. 28) which are decision flip-flop 1 (DFF1) and decision flip-flop 2 (DFF2). These flip flops assume the position that the flip flop in the associated point memory circuit will ultimately assume. The decision is therefore set aside until needed later.

The next steps of the program chain are to check out the ability of any of the point circuit logic to perform any task that may ever be asked of it. The reasoning is that an alarm system ordinarily does not have to show an alarm very often. However, in those rare situations where an alarm does come in, it is essential that the system be prepared to accurately display same. For example, some part of the semiconductor logic may fail and this should be known immediately rather than after some unfortunate event has occurred. It is therefore desirable to check out the system every time a scan is made in order to make sure that the logic is operating properly.

The PMG6 signal also operates a flip flop 28–3 which operates gates 28–4 and 28–6 to see whether or not an F1 signal comes back through the gates 28–4 and 28–6. If it does, the gates are disabled and an output is not obtained. That means the test has been passed. If an F1 signal is not received the gates 28–4 and 28–6 will provide an output signal which will be transferred to the logic failure circuit 32–1 of FIG. 32 at step 7 via gates 28–7 and 28–5. If the test is passed no indication is left and the program moves past step 7.

The results of step 6 are not provided until step 7. Step 7 enables the postcomparator output gate 28–5. The postcomparator output will only be fed into the logic failure or circuit at that time if there was a failure during step 6 as explained above.

The program chain now moves on to step 8. Step 8 places a new condition at the 8 signal lead, sets flip flop 28–2 and opens up the set 2 (S2) circuit 29–3 (FIG. 29) to send an S2 signal out to the addressed point circuit. Flip flop 1 (FF1) of the addressed point circuit has already been locked in the "set" position during program step 6. Flip flop 2 (FF2) is now "set" in addition and provides an acknowledge condition. Feedback 2 (F2) is then fed back to the postcomparator to gates 28–8 and 28–9 and, in program step 9, allows the output of the postcomparator (FIG. 28) to provide a "one" via gate 28–5. This is a check. There will be an output via gate 28–5 only if there is a failure.

Step 10 of the program resets flip flops 28–2 and 28–3 and also puts out a clear signal (CL) via gate 29–1 over the clear (CL) bus and will thus reset both of the flip flops FF1 and FF2 of the selected point circuit. In step 11 the output of the postcomparator is enabled via gate 28–5 to see if all the test signals are now gone.

It will be noted that this gating checks F1 and not F2 first, the F2 signal being of a different polarity. Therefore there must be an F1 and no F2 during the first test (step 6) otherwise there is an error or a fault in the circuit. Step 8 says that both F1 and F2 are operating, otherwise there is a fault and step 10 says that neither F1 nor F2 is operating. Therefore, a test is made for both the absence and the presence of each of the signals F1 and F2. That means that the flip flops of the selected point circuit can be set and cleared, and that there are no short circuits or grounds. Likewise, there is no error of wiring or semiconductor fault if this series of three tests is successfully negotiated. If the tests do show failure, then the logic flip flop 32–2 is enabled and the logic failure lamp 32–3 is lighted. The logic failure indication provides an alarm and the nature of the failure condition can be determined later.

It will now be determined how to tell which of the points has the logic failure. The operator will actuate the Trouble Locate key 32–4 (FIG. 32) which provides a signal to one input of a two-input gate 32–5, the output of the postcomparator being the other input to that gate. The system will now continue to scan once again until it reaches a point which is out of order and at which point it fails the routine test. At that moment, an output is provided from the postcomparator (FIG. 28), the gate 32–5 (FIG. 32) will open and stop the clocks via gates 32–6 and 32–7, thereby preventing further scanning by stopping the program chain.

There is one display lamp for each stage of all registers. When the Trouble Locate key 32–4 is actuated, the scanning stops due to stopping of the clock (FIG. 32). The display indicates the address number of the faulty point. In the case of plug-in cards, it is possible to identify and remove the card for the faulty point circuit and replace it. If this does not provide correction as indicated by continued display of the lamp, then it can be assumed that the error is in the wiring to the point circuit card or in the buffer thereto. To illustrate if the failure is in test 1 (programs 6 and 7 of the program chain), then the clock will stop at point 7 in the program chain. If the failure is at the second test (program 8 and 9 of the program chain), the clock will stop at point 9 and if the failure is at the final test the clock stops at point 11 on the program chain. If the clock stops at test 1, then the error is in the F1 circuits. This can be determined by providing an indicator lamp at each stage of the program chain and the one which is lit would show at which step the scanning stopped. This is done at stages 7, 9 and 11 corresponding to S1, F1 failure, S2, F2 failure and clear failure respectively. No other point circuit alarms can be provided at this time since the system has stopped scanning. The possibility of two failures simultaneously can be determined by actuating the Trouble Locate key 32–4 again since the system will now stop at the next failure.

Other methods can also be used for locating a plurality of simultaneous failures. These other methods are not shown in the subject disclosure, however. One method of finding plural simultaneous faults would be to push the trouble locate 32–4 several times. Statistically, all of the trouble spots should be located unless two of them happen to be right next to each other.

The program chain has now been advanced to step 11 where all of the false information is cleared out that had been put into the system for testing. The system is now prepared to receive the decision which is stored in the decision flip flops 1 and 2 (28–6 and 28–7) which was made previously. Program step 12 opens the gates 28–8 and 28–9 which follow the decision flip flops and allows them to provide an output on S1 and/or S2 (FIG. 29) in proper combination. There is no need to put in a clear signal since the system has already been cleared as a result of the testing steps.

This completes the explanation of the twelve program steps. Steps 3 to 12 did not require operating and releasing relays, therefore all of them took place at logic or high speed clock rates which were brought into play in step 3 by the HSE signal to the clock.

It will be noted that there are unused steps in the chain. The cycle can either go to the end of the chain and recycle or as is done in the present case, use a chain shortener. The chain shortening bus PGR with a strap can cause the chain to re-cycle immediately upon the conclusion of step 12 via AND gates 31–1, 31–2 and 30–2. The recycle gates perform this function. The program recycle signal PGR comes back to the beginning and sets a 1 into the "set" and a "zero" into the clear of the "1" flip flop of the program chain. Stage 1 trips on the next toggle and enables the low speed clock via the LSE signal thereto and the program chain starts over.

There is a manual advance key 32–8 for the program chain (FIG. 32). This is used to check out circuitry. By actuating the program stop key 32–9 to the lower contact position, both of the clocks are stopped. The or gate 32–10 is at the output of the clocks, there being a third clock pulse generator providing an output thereto which is operated by a key 32–8 which is the manual advance. By this means, every time the key is operated, the program chain is advanced one step. Therefore, complex equipment is not required to check the system. The manual advance is similar to a slow jog which steps the program chain from step to step and, with sufficient jogging, the system can be advanced from station to station—one station for every twelve actuations of the manual advance key in the present disclosure. The manual advance feature also allows the circuit to be locked at a particular position on the program chain. The use of the manual advance will allow the determination of whether or not two of the tests in a single point circuit fail. This would not be determinable without the use of this feature. The test system of the present invention makes it easy to locate or localize trouble areas to particular printed circuit or other cards. It is therefore not required to have highly skilled personnel since it is usually only necessary that the faulty card be removed and a similar card be plugged in to replace it.

The manual advance will also allow one to determine with simple instruments such as a voltmeter whether the program chain is advancing or not. Actuation of the logic failure reset 32–11 in FIG. 32 will turn off the logic failure lamp and reset flip flop 32–2.

A complete cycle of operation as far as selecting points and making comparisons is concerned has now been described. The details of the actual comparison and decisions will now be described.

There is always an alarm if the input is too high or too low but it must be determined if someone is aware of this. This is accomplished by comparing the input condition to each point circuit with the settings of the flip flops therein. If both flip flops in the point circuits are in the clear condition, the circuit was normal and a comparison of a normal input with a past normal means that every thing is still good and the decision is to leave it normal. Since the previous decision is always being removed a new decision must always be made and reentered into the point circuit flip flops. This discussion will continue talking too high instead of too low from here on by way of example. If an alarm condition now exists because the point under test is now too high (FIG. 26) a "new alarm" is fed to the precomparator along the horizontal gates which are for new condition via gates 26–1, 26–2 and 26–4 and the vertical gates being for the prior condition. The gate of the precomparator that will be opened will be at the intersection of the previous condition and the present condition. Therefore the intersection of previous normal and present alarm will be gate 23–1 which indicate a new alarm. This causes a conditional alarm to be registered in the memory or decision flip flops via the output of gate 23–1 and gate 27–6 which causes decision flip flops 28–6 and 28–7 to be set at step 4 of the program cycle. This provides an input to the alarm decision gate 27–7 also.

Since this is a new alarm, gate 23–1 will open up and will sound the new alarm horn 28–1 under control of flip flop 27–1 and also the flashing visual indicator 27–8. The horn may also be controlled by fast flash to provide a fast beep sound to be different from a slow horn with slower beeps. There are two flasher gates, 27–2 and 27–3, one for restore signals with slow flash rate.

Resetting of alarm and restore which can be done with or without delay will now be discussed. The actuation of the acknowledge key 25–1 places acknowledge into the circuit as the standard of comparison rather than the alarm or normal condition. When the acknowledge key is actuated, the normal and the alarm inputs are disabled and substitute instead by the acknowledge signal. This is accomplished by applying the acknowledge signal to gates 26–3 and 26–4 in addition to the precomparator and flip flop 27–1. Many of the comparisons are not applicable but must be disposed of. This system therefore says, leave me alone and I will do what I did previously. Therefore, if a point is acknowledged that is in restore condition, it says it is not applicable but something has to be done, so the comparison of previous restore versus acknowledge would have to go to restore and will therefore go to the restore gate as indicated in the drawings.

One cannot change an address in the middle of a program because false information would be set in. Therefore, if one attempted to change the address by jogging at this time, one might lock an alarm condition into a point just addressed. Therefore, synchronizing gates (FIG. 25) for the express purpose of registering the intent to acknowledge or restore are provided and the actual action does not take place until the program chain gets to a safe point which is usually the recycle. It is on the recycle PGR that any alterations can be made. The actuation of the acknowledge key 25-1 therefore sets the flip flop 25-2 and in the rest of these instances, it is the removal of the situation rather than the entry which is necessary. Therefore, the systems stays in the acknowledge condition until acknowledge could have taken place which is at the end of a cycle when the PGR signal is sent to gates 25-3, 25-4 and 25-5 to allow enabling signals to open these gates. The low speed enable LSE is also blocked by actuating the acknowldge or restore keys via gate 26-5. This is because the acknowledged point may be quite a distance from the present address. Thereby a scanning can take place at logic speed rate rather than have the operator wait for a great length of time until the acknowledged station is returned to normal. The synchronizing gates (FIG. 26) take care of not going into or out of a scan at an improper time.

Figure 25:
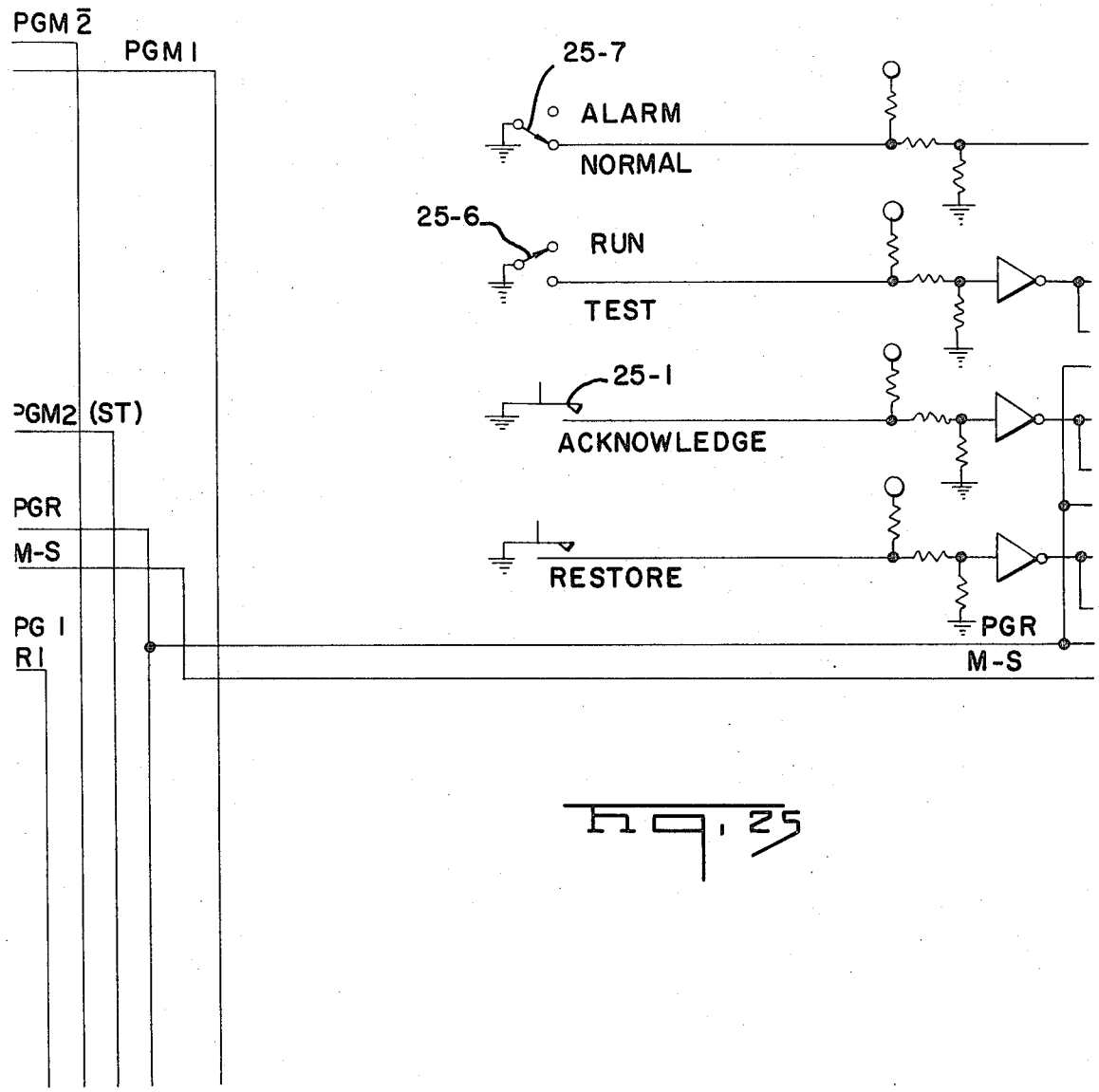
Figure 26:
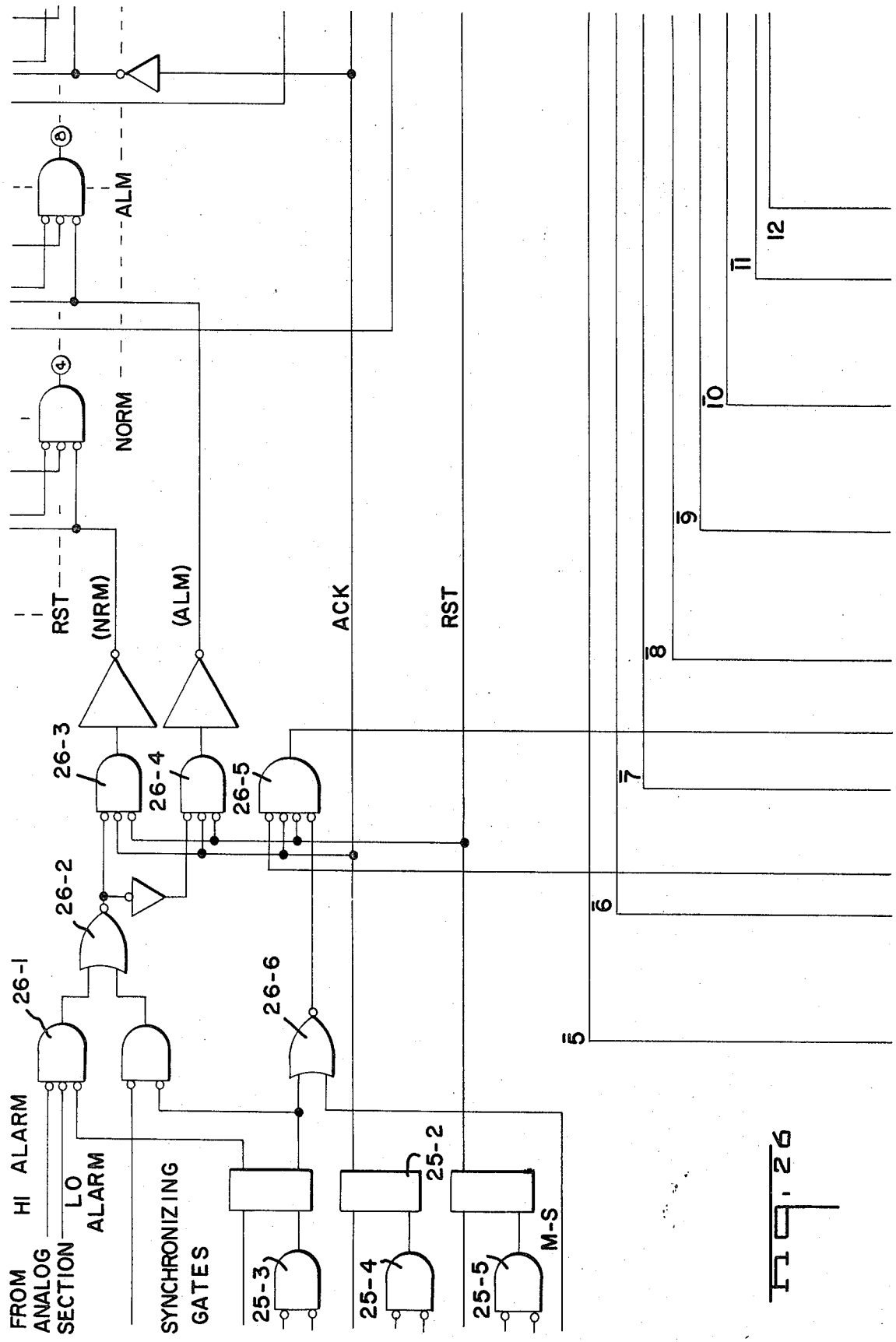
Figure 27:
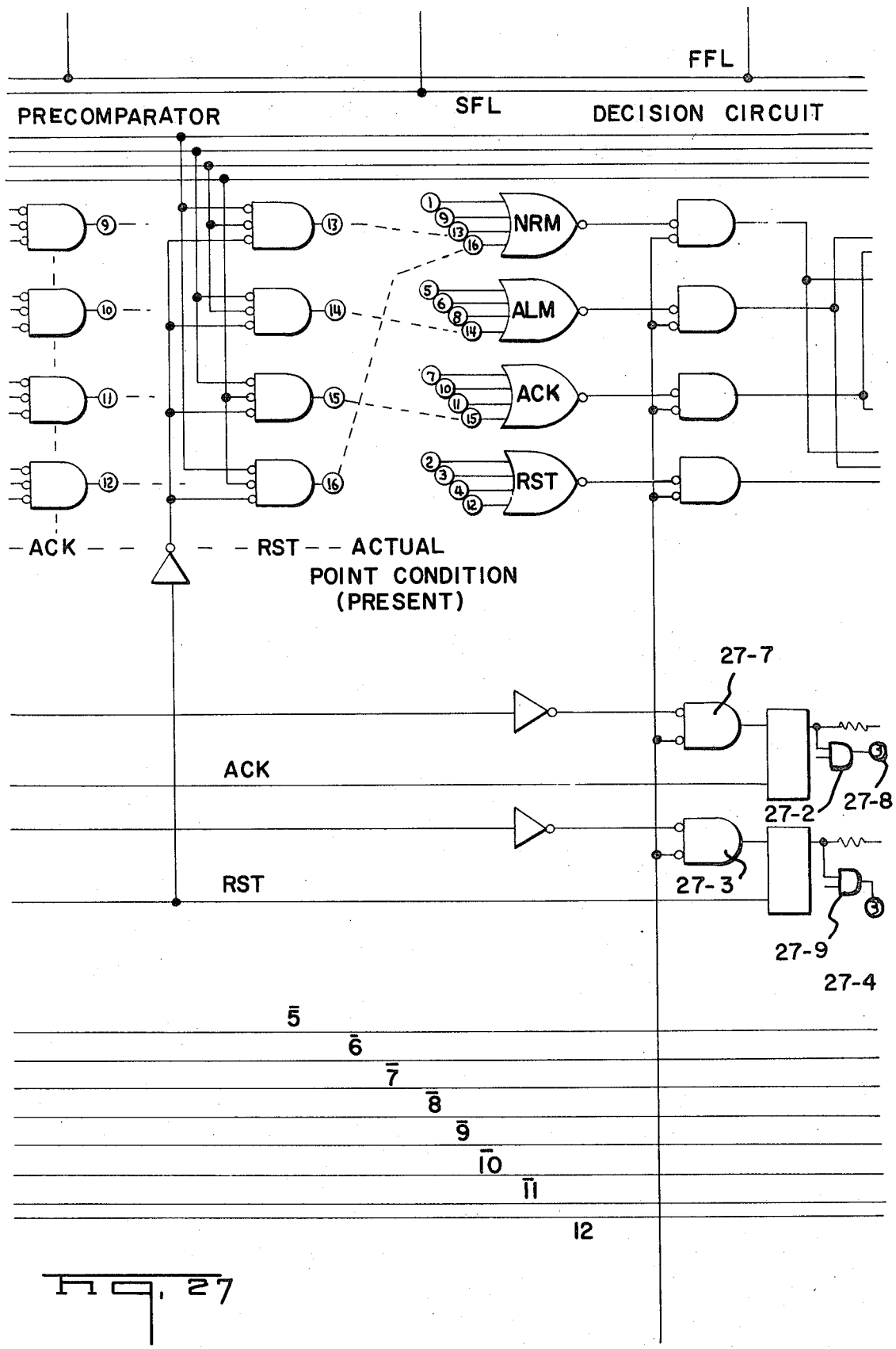
Figure 28:
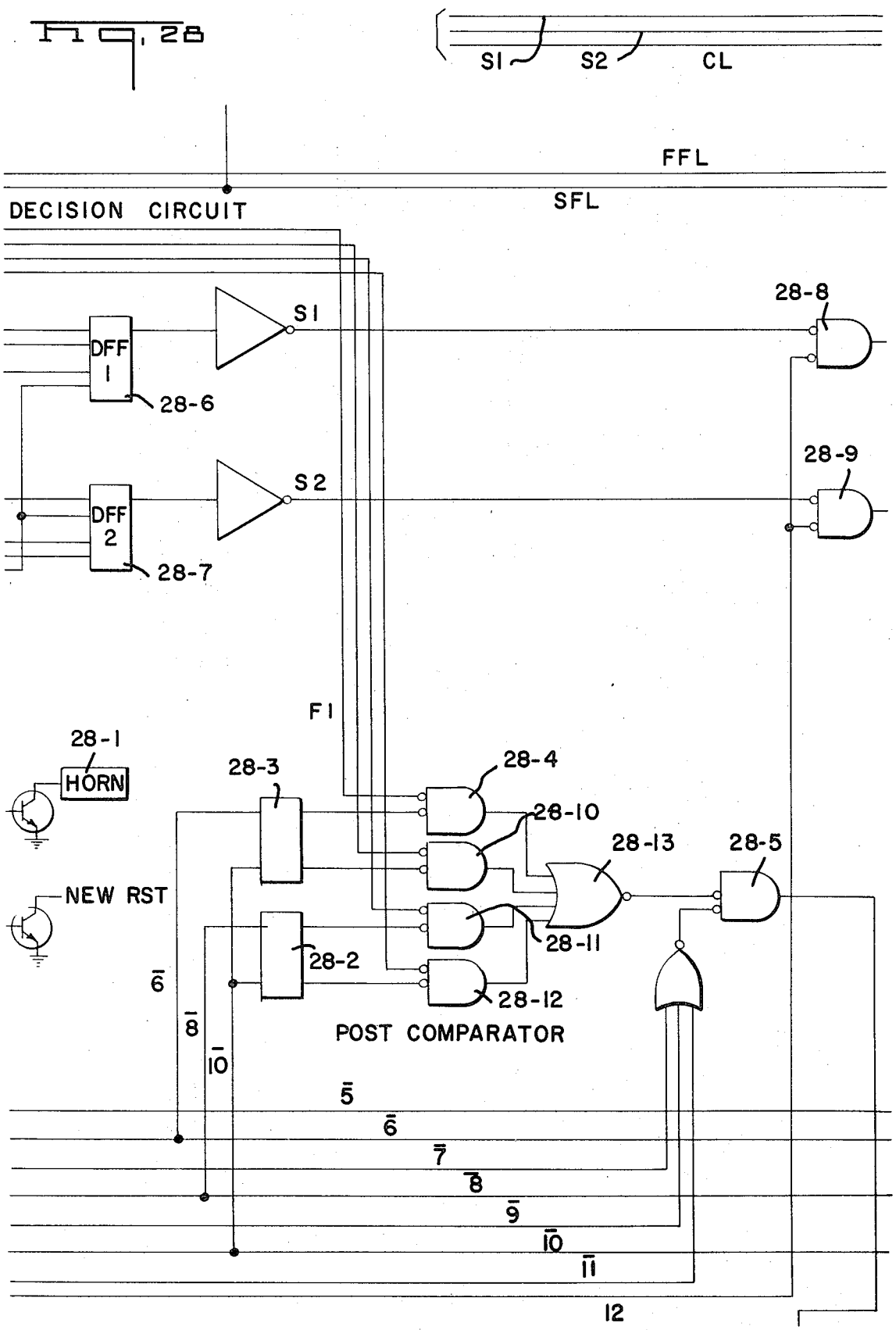
Figure 29:
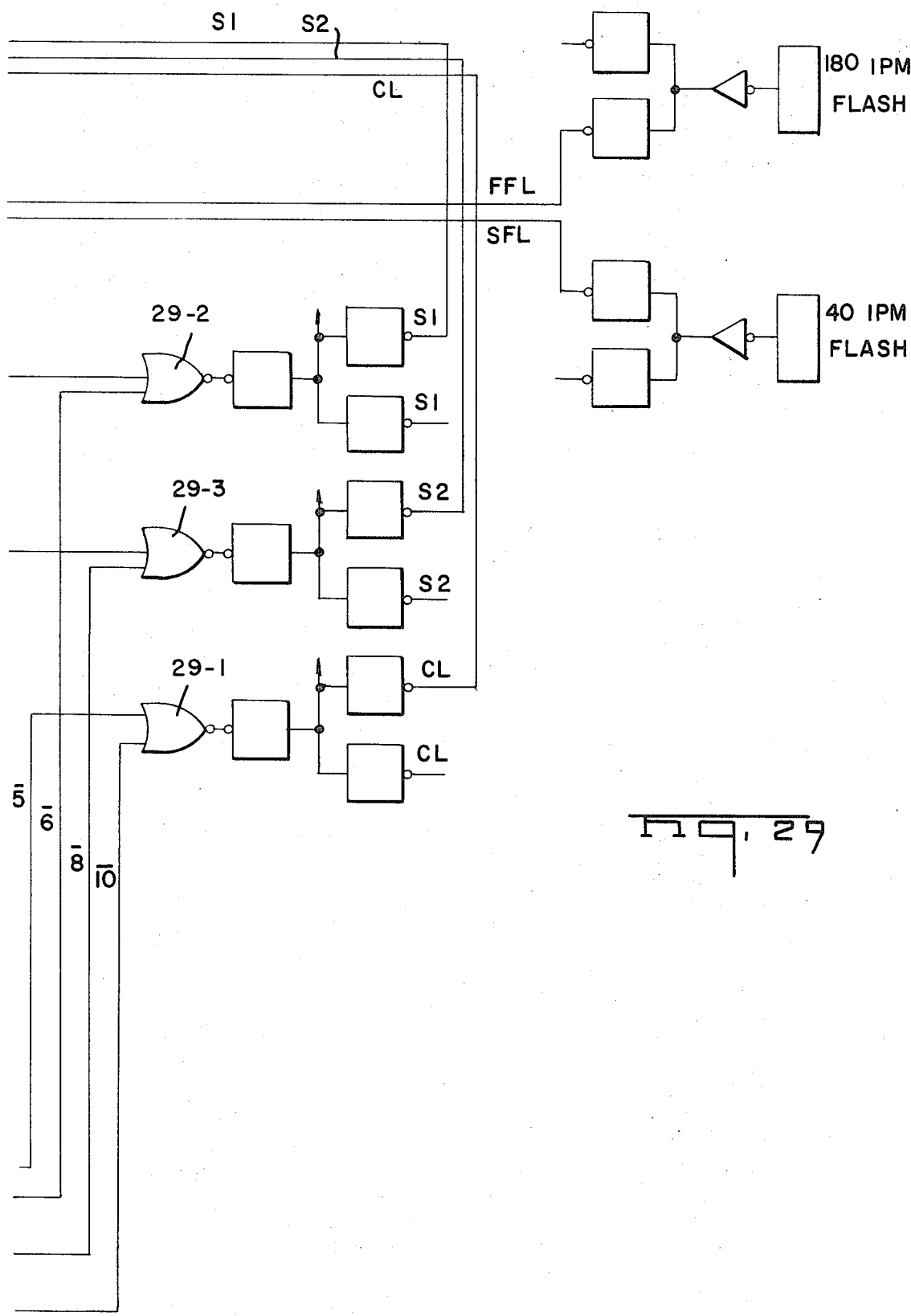

The same is true in the run-test (FIG. 25) which will now be examined. One cannot go into the test condition in the middle of a cycle because it could cause trouble by changing manual input for thermocouple input. It is therefore necessary to stop the scanning on its own and then go into high speed scan for manual testing. Again, the output is sent to gate 26-6 which is then sent to the low speed enable gates 26-5 and shuts them off (FIGS. 25 and 26). If it is desired to test to see if all elements are normal, the test key 25-6, which is a locking key, is actuated and the system goes into high speed scan since no relays are involved. Depression of the normal key 25-7 causes no further gating. Normal goes into the comparator all the time and is just running to the points one after another. The response for each station should be in the normal state, therefor. To provide a complete check the alarm key is pressed. All of the point circuits should go into alarm and the horn should stop.

Then the acknowledge key is actuated. All of the point circuit should go steady and the horn should start. At this time one can note burned out lamps since they are steady. If the system goes back to normal now, the circuit should go back to restore and all lamps at slow flash. If the restore key is now actuated, the lamps should go dark. This is how other defective points can be found. If the above test is used in conjunction with the trouble locate key 32-4, all the points that are defective in a particular circuit can be located. This is a good test because the routine check does not check the precomparator and the decision circuit itself. This is a critical part of the system because a part of the precomparator might not be functioning and the operator would not know this. In the present invention, every piece of logic there is right up to the input of the analog signal is checked including the lights.

The STOP SCAN feature will now be discussed. The key will be changed from the scan to manual position in FIG. 3. The signal comes cut along the $ms$ and $\overline{ms}$ busses. This blocks the entry of stepping pulses from the program chain at gates 7-1 and 7-3 and thereby stops the scanning registers from scanning. The program chain is now still working but it is not changing any addresses in the scanning register. Another operation that occurs when the STOP SCAN key is actuated is to trigger off a one shot multivibrator (FIG. 3) which provides a clear pulse which, in conjunction with a PGR signal at gate 3-2 resets the registers. PGR stands for program recycle so the gate 3-2 receives the PGR signal plus the output of the one shot. The system cannot be cleared until the program recycle signal PGR is received from the program chain. Therefore an address cannot be altered in the middle of an operation. This clear operation leaves nothing in the registers. The MS signal goes through gate 7-4 to provide a recycle inhibit on buss RI. Therefore when the system is switched into manual scan the recycling is inhibited. Otherwise when it cleared it would come immediately to 000. Recycle inhibit (RI) is also sent to the program chain so that the program chain will stop and wait until instructed to operate. Therefore, actuating the manual scan key 3-1 stops the program chain once it gets to the end of a cycle. The registers are not scanning and have been inhibited and cleared. Register recycling has been inhibited so that it cannot prime in zeroes. The system is not registering 000 but blank blank blank. In other words, it goes to the end of the program chain and the program chain then stops. When the program chain gets to the end, the program recycle opens the gate and allows the clear pulse to come through and clear out these registers. In the meantime, the recycle inhibit buss also again inhibits so that 000 could not be primed in.

The steering chain (FIGS. 3 and 12) operates identically to that disclosed in Ser. No. 630,753. With the system in manual scan, the system will be cleared by operation of clear key 3—3 via gate 3-2 as explained hereinbelow if the system has not already been cleared. Operation of the clear key will also cause removal of any address stored in the scanning register. Also, the steering chain (FIGS. 3 and 12), which is a shift register including flip-flops 12-1, 12-2, 3-4 and 3-5 is reset to receive a new address. Flip-flop 12-1 provides an RGS signal which becomes the RI signal at gate 7-4 and inhibits recycling of the program chain as previously explained. From here on, operation of keys of the manual keyset (FIG. 12) will cause the steering chain to shift via a signal along the ADV bus. The output of each flip-flop of the steering chain is coupled to each input gate of the associated register. In this manner, the first operation of the keyset will enable all gates in the hundreds register since flip-flop 3-5 is set by resetting of the steering chain and the proper flip-flop of the hundreds register is set. This procedure continues for the tens and units digits of the station be addressed, each operation of the keyset stepping the steering chain. It will be noted that the entry of the third digit sets flip-flop 12-1 which provides the RI signal and prevents changes of address due to program chain operation as previously explained. The present system also includes the jog feature which provides for change of a manually set address to the next address. The RGS signal is the recycle gate start. Recycling was blocked by the MS signal as previously stated. After the last entered address digit, recycling is unblocked so that the program chain may now restart. It will not send step pulses (ST), but it will routine so that readings can be taken of everything else. However, the system can also jog since the recycling gate is now open. When we get to the nine of an address the system will now decade over. The jog requires change of address and therefore must be synchronized with the program chain. It cannot change the address until the end of the program is reached. This is accomplished by having the jog key 3-6 depressed and sets the intent to jog flip-flop 7-5 which locks out the possibility of jogging and the jog takes place when it is unlocked. There is a capacitor 7-6 which differentiates the input thereto and makes a pulse (FIG. 7) so that when flip-flop 7-5 is reset again by the program chain it then sends out the jog pulse. The scanning register now stores the address of the next station and the program chain will keep going through its cycles repeatedly but will not provide a pulse for going to the next station. The program chain does send a step pulse but it is not permitted to get through so the address will not change. The circuit in FIG. 7 from the jog key is a Schmitt trigger so that the system will not give a plurality of pulses but only one pulse during a single jog key operation. The clear key 3—3 is used when a new address is to be placed into the register or when a mistake has been made. This is done when it is not desirable to jog up to the new address. The system puts out a pulse which clears all of the registers and the steering chain. The steering chain then removes the RGS signal and the recycle stops are inhibited.

Figure 12:
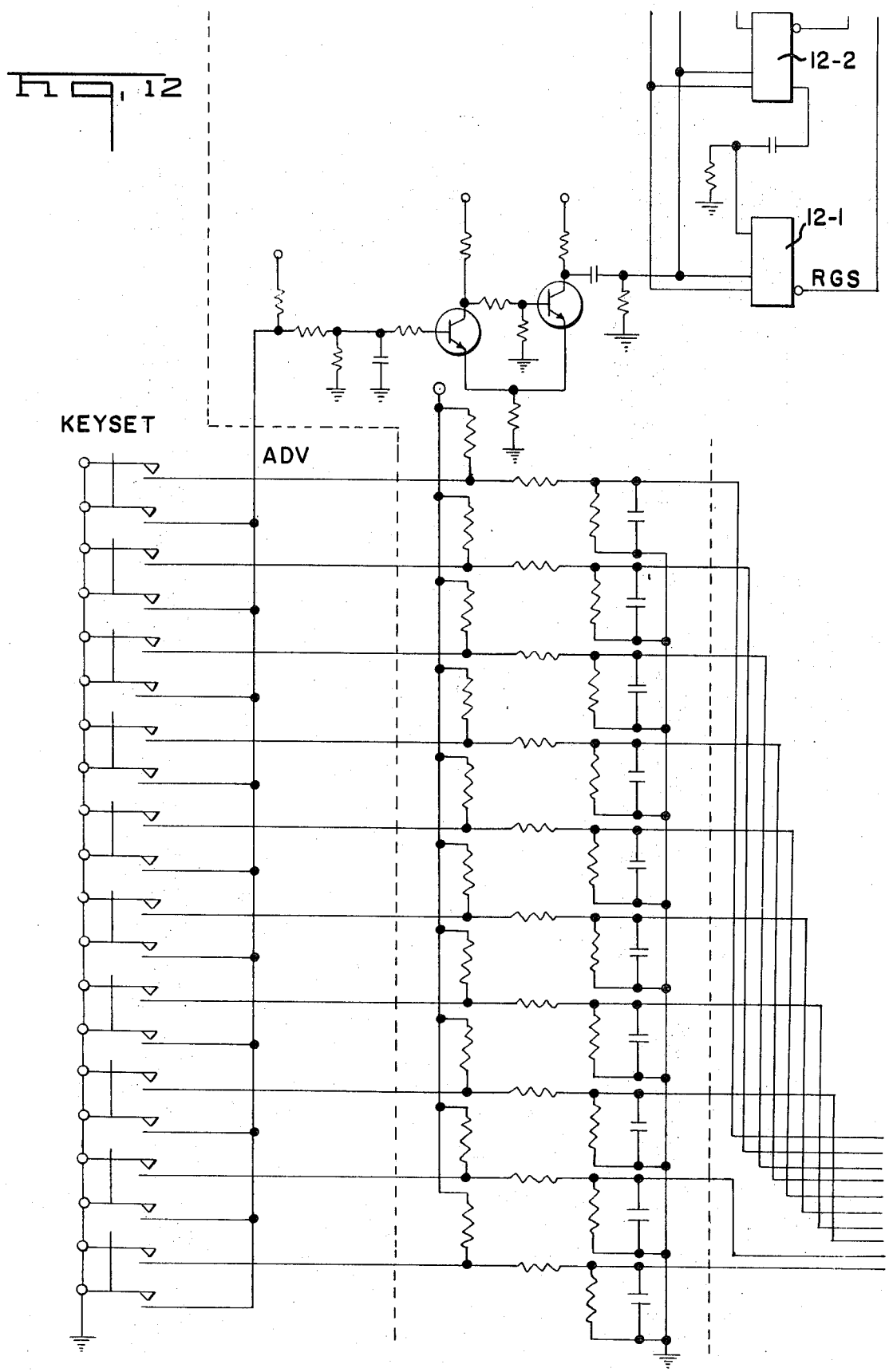

Now referring to the INFORMATION EXTRACTION (FIG. 1) a manual key set is provided identical to the one in FIG. 12. It also has its own steering chain and its own registers but instead of going to gate drivers the register output goes to coincidence or comparator gates. Such circuits are well known. One side of each coincidence gate is connected to the register output that would normally go to gate drivers and the other side is placed in parallel with the leads that would go to gate drivers. When a match is sensed there is coincidence. The necessary information is then received, stored, displayed, etc.

Though the invention has been described with respect to a preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. A scanning monitor system which comprises a program chain including a shift register for controlling said system, clock means for controlling said shift register, said clock means including a high speed clock and a low speed clock and means responsive to predetermined outputs of said shift register for coupling a predetermined one of said clock means to said shift register.

2. A system as set forth in claim 1 further including means responsive to predetermined machine operation instructions for delaying said operation until said shift register has shifted to a predetermined output therefrom.

3. A system as set forth in claim 1 further including a plurality of switch relays, scanning means for addressing said relays in predetermined order and prerelease means for disconnecting a closed relay prior to connecting the next open relay.

4. A system as set forth in claim 3 wherein said prerelease means includes means responsive to a first output from said shift register to disconnect a previously addressed relay and means responsive to a later output of said shift register for connecting a newly addressed relay.

5. A system as set forth in claim 3 further including means for stopping said scanning means and means for placing a predetermined address in said scanning means.

6. A system as set forth in claim 5 further including manual means for changing the address in said scanning means to the next consecutive address.

7. A system as set forth in claim 3 further including means responsive to a predetermined address in said scanning means for reading out a predetermind indication at said addressed station.

8. A system as set forth in claim 7 further including means for storing said indication.

9. A system as set forth in claim 8 further including means for selecting one of a plurality of indications at said addressed station.

References Cited

UNITED STATES PATENTS

| 2,832,948 | 4/1958 | Derr et al. | 340—213.1 |
| 2,901,739 | 8/1959 | Freitas | 340—413 |
| 2,905,520 | 9/1959 | Anderson | 340—413 X |
| 3,392,379 | 7/1968 | Thomason et al. | 340—213.1 |

ALVIN H. WARING, Primary Examiner

C. M. MARMELSTEIN, Assistant Examiner

U.S. Cl. X.R.

340—412